(12) United States Patent
Moon

(10) Patent No.: US 12,267,325 B2
(45) Date of Patent: Apr. 1, 2025

(54) LOCALIZED MACHINE LEARNING OF USER BEHAVIORS IN NETWORK OPERATING SYSTEM FOR ENHANCED SECURE SERVICES IN SECURE DATA NETWORK

(71) Applicant: WhiteStar Communications, Inc., Durham, NC (US)

(72) Inventor: Billy Gayle Moon, Apex, NC (US)

(73) Assignee: WhiteStar Communications, Inc., Durham, NC (US)

( * ) Notice: Subject to any disclaimer, the term of this patent is extended or adjusted under 35 U.S.C. 154(b) by 326 days.

(21) Appl. No.: 17/378,312

(22) Filed: Jul. 16, 2021

(65) Prior Publication Data

US 2023/0020504 A1 Jan. 19, 2023

(51) Int. Cl.
*H04L 9/40* (2022.01)
*G06F 9/54* (2006.01)
(Continued)

(52) U.S. Cl.
CPC .............. *H04L 63/10* (2013.01); *G06F 9/541* (2013.01); *G06N 20/00* (2019.01); *H04L 67/104* (2013.01)

(58) Field of Classification Search
CPC ..... H04L 63/10; H04L 67/104; H04L 67/535; G06F 9/541; G06N 20/00
See application file for complete search history.

(56) References Cited

U.S. PATENT DOCUMENTS 6,527,591 B1 * 3/2003 Oross .................. G06F 13/4045
361/679.45
7,792,989 B2 9/2010 Toebes et al.
(Continued)

OTHER PUBLICATIONS

Callas et al., "OpenPGP Message Format", Network Working Group, Request for Comments: 4880, Nov. 2007, [online], [retrieved on Oct. 28, 2021]. Retrieved from the Internet: URL: <https://www.rfc-editor.org/rfc/pdfrfc/rfc4880.txt.pdf>, pp. 1-90.
(Continued)

*Primary Examiner* — Michael W Chao
*Assistant Examiner* — Peiliang Pan
(74) *Attorney, Agent, or Firm* — Leon R. Turkevich

(57) ABSTRACT

In one embodiment, a method comprises: initiating, by an executable agent within a secure executable container executed by a network device, a monitoring of a network-based service between the network device and a second network device having a two-way trusted relationship with the network device within a secure peer-to-peer data network, the network-based service based on a securely-stored secure data structure or a securely-transmitted secure data structure in the secure peer-to-peer data network; executing, by the executable agent, a secure machine learning operation based on one or more user actions associated with the network-based service, wherein the secure executable container prevents any access of any unencrypted data structure, or accessing the secure peer-to-peer data network, without authorized access via a prescribed Application Programming Interface (API); and autonomously executing, by the executable agent, an improved operation for the network-based service based on the machine learning.

22 Claims, 12 Drawing Sheets

(51) Int. Cl.
  *G06N 20/00* (2019.01)
  *H04L 67/104* (2022.01)

(56) References Cited

U.S. PATENT DOCUMENTS

| | | | | |
|---|---|---|---|---|
| 7,818,607 | B2 | 10/2010 | Turner et al. | |
| 9,218,588 | B2* | 12/2015 | Bennett | G06F 3/0482 |
| 9,800,429 | B2* | 10/2017 | Crayford | H05B 47/19 |
| 10,849,175 | B2* | 11/2020 | Vanscoyk | H04W 48/18 |
| 11,102,202 | B2* | 8/2021 | Swaminath | H04L 9/3255 |
| 11,140,136 | B1* | 10/2021 | Li | H04L 63/0414 |
| 11,240,144 | B2* | 2/2022 | Suryanarayana | H04L 41/20 |
| 11,304,091 | B2* | 4/2022 | Maria | G06F 9/45558 |
| 11,457,040 | B1* | 9/2022 | Sole | H04L 63/101 |
| 11,481,652 | B2* | 10/2022 | Knox | G06V 10/764 |
| 11,604,810 | B2* | 3/2023 | Fouda | G06F 21/6227 |
| 11,750,543 | B2* | 9/2023 | Mikhailov | H04L 67/52 |
| | | | | 709/206 |
| 11,755,886 | B2* | 9/2023 | Merlin | H04B 17/318 |
| | | | | 455/456.1 |
| 11,836,228 | B2* | 12/2023 | Joseph | G06F 16/9535 |
| 11,871,299 | B2* | 1/2024 | Karmanov | H04W 4/029 |
| 2007/0033569 | A1* | 2/2007 | Davidson | H04L 67/59 |
| | | | | 717/103 |
| 2012/0120845 | A1* | 5/2012 | Perras | H04W 8/186 |
| | | | | 370/254 |
| 2017/0222920 | A1* | 8/2017 | Thubert | H04L 69/22 |
| 2020/0252411 | A1* | 8/2020 | Inforzato | H04L 63/1425 |
| 2021/0026535 | A1 | 1/2021 | Moon | |
| 2021/0026976 | A1 | 1/2021 | Moon | |
| 2021/0028940 | A1 | 1/2021 | Moon | |
| 2021/0028943 | A1 | 1/2021 | Moon | |
| 2021/0029092 | A1 | 1/2021 | Moon | |
| 2021/0029125 | A1 | 1/2021 | Moon | |
| 2021/0029126 | A1 | 1/2021 | Moon | |
| 2021/0029389 | A1* | 1/2021 | Zhang | H04N 21/4788 |
| 2021/0081524 | A1 | 3/2021 | Moon | |
| 2021/0117624 | A1* | 4/2021 | Aghajanyan | H04L 51/02 |
| 2022/0217582 | A1* | 7/2022 | Maria | H04W 4/70 |
| 2023/0012373 | A1* | 1/2023 | Moon | H04L 63/045 |
| 2023/0033192 | A1* | 2/2023 | Sutherland | G06F 21/602 |
| 2023/0044802 | A1* | 2/2023 | Coen | G16H 40/20 |
| 2023/0110131 | A1* | 4/2023 | Smith | H04W 12/76 |
| | | | | 370/254 |
| 2023/0306407 | A1* | 9/2023 | Bodalia | G06Q 20/4016 |

OTHER PUBLICATIONS

"4-Way Handshake", Jan. 24, 2019, [online], [retrieved on Jun. 1, 2021]. Retrieved from the Internet: URL: https://www.wifi-professionals.com/2019/01/4-way-handshake>, pp. 1-21.

Thubert, Ed., et al., "Address Protected Neighbor Discovery for Low-Power and Lossy Networks", [online], 6lo Internet Draft, Feb. 23, 2018, [retrieved on Oct. 30, 2018]. Retrieved from the Internet: URL: <https://tools.ietf.org/pdf/draft-ietf-6lo-ap-nd-06.pdf>, pp. 1-22.

Lehembre, "Wi-Fi-security—WEP, WPA and WPA2", Jun. 2005, [online], [retrieved on Jun. 1, 2021]. Retrieved from the Internet: URL: <http://tele1.dee.fct.unl.pt/rit2_2015_2016/files/hakin9_wifi_EN.pdf>, 14 pages.

Leach et al., "A Universally Unique IDentifier (UUID) URN Namespace", Network Working Group, Request for Comments: 4122, Jul. 2005, [online], [retrieved on May 20, 2021]. Retrieved from the Internet: URL: <https://www.rfc-editor.org/rfc/pdfrfc/rfc4122.txt.pdf>, pp. 1-32.

Winter, Ed., et al., "RPL: IPv6 Routing Protocol for Low-Power and Lossy Networks", Internet Engineering Task Force (IETF), Request for Comments: 6550, Mar. 2012, pp. 1-157.

Thubert, Ed., et al., "Registration Extensions for IPv6 over Low-Power Wireless Personal Area Network (6LoWPAN) Neighbor Discovery", [online], Internet Engineering Task Force (IETF), Request for Comments: 8505, Nov. 2018, [retrieved on Nov. 16, 2018]. Retrieved from the Internet: <https://tools.ietf.org/pdf/rfc8505.pdf>, pp. 1-47.

Wikipedia, "Transclusion", Jul. 7, 2021, [online], [retrieved on Jul. 9, 2021]. Retrieved from the Internet: URL: <https://en.wikipedia.org/wiki/Transclusion>, 6 pages.

Moon, U.S. Appl. No. 17/372,607, filed Jul. 12, 2021.

Society video, "Society Secure Messenger: The world's most secure way to chat", Text and Screenshots, (Mar. 10, 2020), [online], [Retrieved on Mar. 3, 2022]. Retrieved from the Internet: URL: <https://www.youtube.com/watch?v=jSRmnseSCVA>, 9 pages.

Society video, "Complete AI Security", Text, Transcript, and Screenshots, (Mar. 19, 2020), [online], [Retrieved on Mar. 3, 2022]. Retrieved from the Internet: URL: <https://www.youtube.com/watch?v=5U2khXXcDMo>, 16 pages.

Society video, "Society's Best in Class Security and the Cohort System", Text, Transcript, and Screenshots, (Mar. 26, 2020), [online], [Retrieved on Mar. 3, 2022]. Retrieved from the Internet: URL: <https://www.youtube.com/watch?v=dwUlktWMMoc>, 11 pages.

Society video, "Society Tutorial 6 : Advanced Controls", Transcript and Screenshots, (Apr. 6, 2020), [online], [Retrieved on Mar. 3, 2022]. Retrieved from the Internet: URL: <https://www.youtube.com/watch?v=5jIVTcQmADw>, 5 pages.

Society video, "Society Tutorial 5: Conversation Controls", Transcript and Screenshots, (Apr. 6, 2020), [online], [Retrieved on Mar. 4, 2022]. Retrieved from the Internet: URL: <https://www.youtube.com/watch?v=v6uDbsFPqhc>, 11 pages.

Society video, "Creating a Conversation", Transcript and Screenshots, (Apr. 6, 2020), [online], [Retrieved on Mar. 4, 2022]. Retrieved from the Internet: URL: <https://www.youtube.com/watch?v=irvX9ZyaPLM>, 4 pages.

Society video, "Society Tutorial Part 7 : Notifications and Misc", Transcript and Screenshots, (Apr. 6, 2020), [online], [Retrieved on Mar. 4, 2022]. Retrieved from the Internet: URL: <https://www.youtube.com/watch?v=muxTsR1PvZA>, 7 pages.

Society video, "Society Tutorial 1: Setting Up and Making a Connection", Transcript and Screenshots, (Jun. 29, 2020), [online], [Retrieved on Mar. 4, 2022]. Retrieved from the Internet: URL: <https://www.youtube.com/watch?v=4k8cYbv-Of0>, 15 pages.

Wikipedia, "Berkeley sockets", May 1, 2021, [online], [retrieved on Apr. 19, 2024]. Retrieved from the Internet: URL: <https://en.wikipedia.org/w/index.php?title=Berkeley_sockets&oldid=1020880821>, pp. 1-12.

Bowen, "Kernel-Bypass Networking", GoDaddy Resource Library, Dec. 10, 2019, [online], [retrieved on Apr. 19, 2024]. Retrieved from the Internet: URL: <https://www.godaddy.com/resources/news/kernel-bypass-networking>, pp. 1-6.

Eclypsium Research Presents, "Perilous Peripherals: The Hidden Dangers Inside Windows and Linux Computers", Eclypsium, Inc., 2020, [online], [retrieved on May 8, 2024]. Retrieved from the Internet: URL: <https://eclypsium.com/wp-content/uploads/Eclypsium-Unsigned-Peripheral-Firmware-Research-1.pdf>, pp. 1-5.

Squyres, "MPI Newbie: What is 'operating system bypass'?", Cisco Blogs, May 30, 2015, [online], [retrieved on May 8, 2024]. Retrieved from the Internet: URL: <https://blogs.cisco.com/performance/mpi-newbie-what-is-operating-system-bypass>, pp. 1-7.

Wikipedia, "Multi-Booting", Jan. 14, 2021, [online], [retrieved on Sep. 17, 2024]. Retrieved from the Internet: URL: https://en.wikipedia.org/w/index.php?title=Multi-booting&oldid=1028483918>, pp. 1-6.

\* cited by examiner

LOCALIZED MACHINE LEARNING OF USER BEHAVIORS IN NETWORK OPERATING SYSTEM FOR ENHANCED SECURE SERVICES IN SECURE DATA NETWORK

STATEMENT REGARDING PRIOR DISCLOSURES BY THE INVENTOR OR A JOINT INVENTOR

The following U.S. Patent Publications do not qualify as prior art under 35 USC 102(b)(1)(A) because their Jan. 28, 2021 publications are (1) one year or less before the effective filing date of the claimed invention, and (2) by the inventor or a joint inventor: U.S. Pub. 2021/0026535; U.S. Pub. 2021/0026976; U.S. Pub. 2021/0028940; U.S. Pub. 2021/0028943; U.S. Pub. 2021/0029092; U.S. Pub. 2021/0029125; and U.S Pub. 2021/0029126, the disclosures all of which are incorporated herein by reference to the extent not inconsistent with this application.

TECHNICAL FIELD

The present disclosure generally relates to localized machine learning of user behaviors in a network operating system for enhanced secure services in a secure data network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The Internet Protocol (IP) has enabled the Internet to evolve from a set of connected research institutions and universities to a world wide web of connected IP devices that enables worldwide communications between user-controlled devices ("user devices"), Internet of Things (IoT) devices (devices that do not require user control), and server devices providing ever-increasing cloud-based services such as social networking services, business transaction services, media distribution services, data storage services, etc. The enormous success of the Internet is based on the deployment of IP routing protocols that enable a "source" device (having a corresponding "source IP address") that is connected to the Internet to reach a "destination" device (having a corresponding "destination IP address") that also is connected to the Internet.

This universal reachability also has introduced severe security threats to each and every IP device that is connected to the Internet, because any "threat device" originating at a "source" IP address (e.g., a malfunctioning network device infected by malware or a network device operated by a malicious user) can threaten any "target device" at a "destination" IP address in an attempt to steal private data, disrupt the target device, etc. Hence, this universal reachability has resulted in losses on the order of billions (or even trillions) of dollars in losses due to attacks on targeted devices, including attacks on personal devices, as well as attacks on large-scale corporate, government, and/or military networks. Individuals and institutions collectively have expended billions of dollars in network security in an attempt to thwart or mitigate against online attacks, yet malicious users still have been able to overcome network security attempts.

Existing security threats in the Internet can exploit a user entity (e.g., business, association, government agency, etc.) acquiring a user "identity" that enables the user entity to be reached via the Internet. For example, a user entity can acquire a Uniform Resource Identifier (URI) from a prescribed naming authority (e.g., ICANN), and associate the URI with one or more domain name services (DNS); a user entity also can acquire a "social network identity" on an Internet-based service provider (e.g., Facebook, Twitter, etc.). The exposure of a user identity (e.g., URIs, social network identities) enables executable web crawlers of Internet search engines (e.g., Google, Bing, Yahoo, DuckDuckGo, etc.) or Internet-based service providers to data mine user metadata of the user entities, execute analytics to exploit the user metadata, implement unauthorized monetizing of the user metadata, and send unwanted web content to the user (e.g., targeted advertisements, addictive web content targeted for the user, etc.).

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
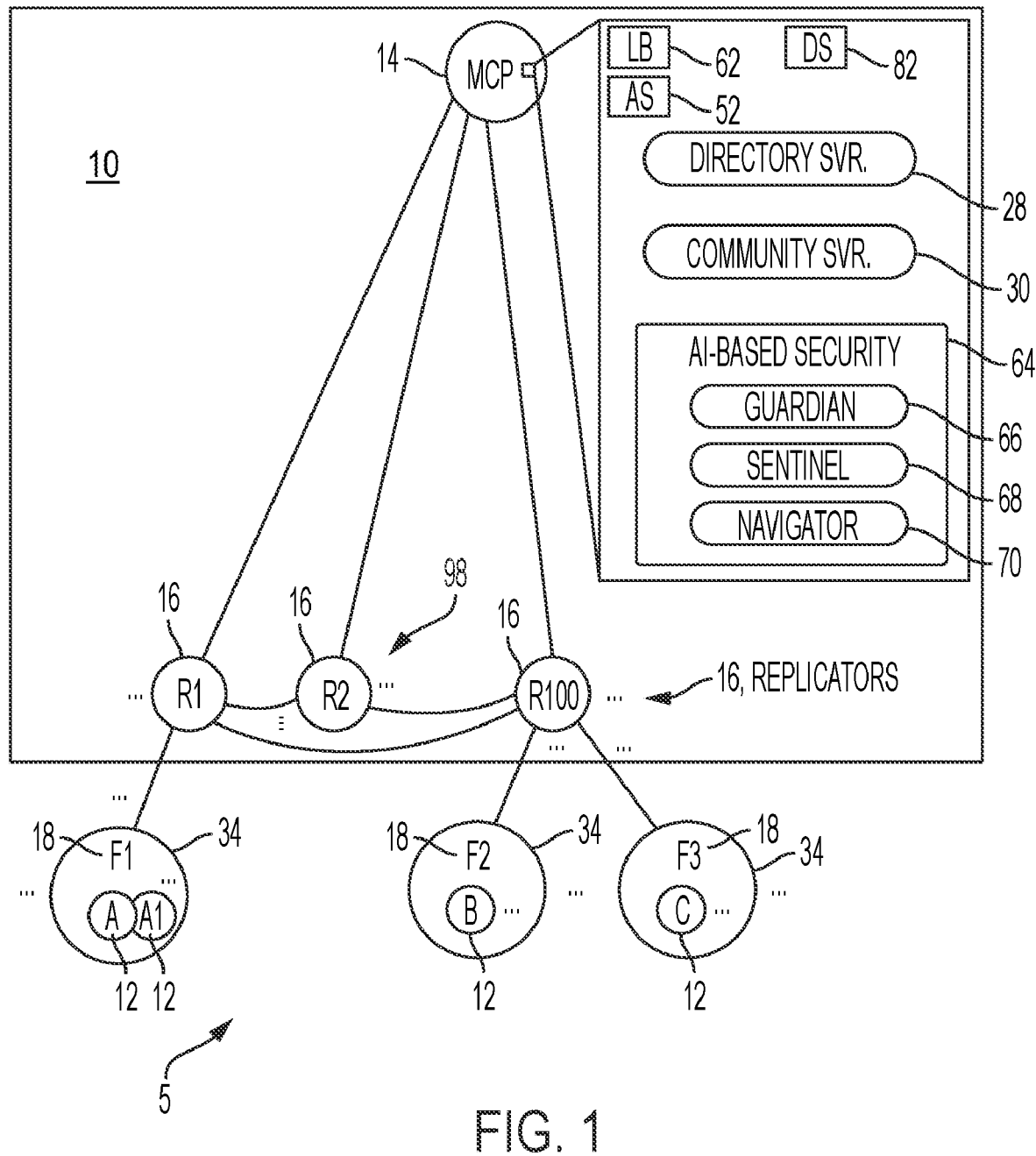
FIG. 1 illustrates a secure peer-to-peer data network comprising an apparatus executing localized secure machine learning of user behaviors for enhanced secure services in a secure peer-to-peer data network, according to an example embodiment.

In one embodiment, a method comprises: initiating, by an executable agent within a secure executable container executed by a network device, a monitoring of a network-based service between the network device and a second network device having a two-way trusted relationship with the network device within a secure peer-to-peer data network, the network-based service based on one or more of a first secure data structure having a secure storage in the network device or a second secure data structure for secure communications in the secure peer-to-peer data network; executing, by the executable agent, a secure machine learning operation based on one or more user actions associated with the network-based service, wherein the secure executable container prevents any executable resource in the network device from accessing any unencrypted form of the first or second secure data structures, or accessing the secure peer-to-peer data network, without authorized access via a prescribed Application Programming Interface (API) required by the secure executable container; and autonomically executing, by the executable agent, an improved operation for the network-based service based on the secure machine learning operation.

In another embodiment, one or more non-transitory tangible media is encoded with logic for execution by a machine and when executed by the machine operable for: initiating, by an executable agent, within the non-transitory tangible media implemented as secure executable container executed by the machine implemented as a network device, a monitoring of a network-based service between the network device and a second network device having a two-way trusted relationship with the network device within a secure peer-to-peer data network, the network-based service based on one or more of a first secure data structure having a secure storage in the network device or a second secure data structure for secure communications in the secure peer-to-peer data network; executing, by the executable agent, a secure machine learning operation based on one or more user actions associated with the network-based service, wherein the secure executable container prevents any executable resource in the network device from accessing any unencrypted form of the first or second secure data structures, or accessing the secure peer-to-peer data network, without authorized access via a prescribed Application Programming Interface (API) required by the secure executable container; and autonomically executing, by the executable agent, an improved operation for the network-based service based on the secure machine learning operation.

In another embodiment, an apparatus comprises apparatus implemented as a physical machine, the apparatus comprising: non-transitory machine readable media configured for storing executable machine readable code; a device interface circuit; and a processor circuit. The processor circuit is configured for executing the machine readable code, and when executing the machine readable code operable for: initiating, by an executable agent within a secure executable container executed by the apparatus implemented as a network device, a monitoring of a network-based service between the network device and a second network device having a two-way trusted relationship with the network device within a secure peer-to-peer data network, the network-based service based on one or more of a first secure data structure having a secure storage in the network device or a second secure data structure for secure communications in the secure peer-to-peer data network; executing, by the executable agent, a secure machine learning operation based on one or more user actions associated with the network-based service, wherein the secure executable container prevents any executable resource in the network device from accessing any unencrypted form of the first or second secure data structures, or accessing the secure peer-to-peer data network, without authorized access via a prescribed Application Programming Interface (API) required by the secure executable container; and autonomically executing, by the executable agent, an improved operation for the network-based service based on the secure machine learning operation.

DETAILED DESCRIPTION

Particular embodiments enable localized secure machine learning of user behaviors using Artificial Intelligence (AI)-based detection and heuristic analysis, in order to provide enhanced secure services to a network user in a secure peer-to-peer data network. The localized secure machine learning is implemented based on local executable agents in a network operating system executed by a network device (e.g., a user endpoint device controlled by a user entity, or a replicator device having a two-way trusted relationship with the endpoint device) within the secure peer-to-peer data network): the network operating system, implemented within every network device in the secure peer-to-peer data network, provides exclusive access to the secure peer-to-peer data network; in other words, the network operating system (also referred to herein as a "secure executable container") prevents any executable resource in the corresponding network device from accessing any unencrypted form of any "at-rest" or "in-flight" secure data structures, or accessing the secure peer-to-peer data network, without authorized access via a prescribed Application Programming Interface (API) required by the network operating system.

A fundamental problem with existing Internet technology is that the Internet was architected at the network layer (layer 3) with an Internet Protocol (IP) that merely routed data packets between a source device and a destination device, with no regard for anti-fraud protection, protecting user identities, etc. The worldwide deployment of the Internet using Internet Protocol at the network layer thus exposed network devices connected to the Internet to malicious attacks, and exploitation of user identities by service providers that have executed machine learning of user behaviors in order to identify targeted advertising to Internet users, including targeting addictive content.

Moreover, the use of Internet Protocol at the network layer, without any regard for anti-fraud protection or user identity protection at the network layer, resulted in implementing security-based network services (e.g., protecting owned content, building directories, building ontologies, providing security, etc.) "above" the layer 3 (network) layer, typically at the application layer; unfortunately, implementing security-based network services at the application layer cannot prevent a malicious user from reaching a target via the layer 3 Internet, especially since a malicious user often can bypass the OSI (Open Systems Interconnect) protocol stack using unencrypted "raw" data packets that can bypass a TCP/IP stack.

In contrast, the network operating system according to example embodiments maintains exclusive control over all access to the secure peer-to-peer data network and access to any data structure associated with the secure peer-to-peer data network, including any and all user metadata for any user accessing the secure peer-to-peer data network. Consequently, the network operating system can securely limit a "scope" of a machine learning operation to a user endpoint device and a replicator device having established a two-way trusted relationship with the user endpoint device, resulting in a "secure" machine learning operation that prevents any user identifier (or any associated user metadata) from being distributed beyond the trusted replicator device; hence, the network operating system can prevent a user identifier (or associated user metadata) from being distributed to any network-based search resource in the secure peer-to-peer data network, or to any network entity in an external data network (e.g., the Internet) outside the secure peer-to-peer data network.

Moreover, the network operating system ensures that any and all user metadata is stored securely in an endpoint device (e.g., in a secure user database owned and controlled exclusively by the user) and/or a trusted replicator device (e.g., as cached search requests from requesting endpoint devices), ensuring that no user identifier (or any associated user metadata) is ever distributed beyond the trusted replicator device to any network-based search resource, or to any network entity in an external data network outside the secure peer-to-peer data network. Hence, the network operating system in a network device (e.g., an endpoint device or a replicator device having a two-way trusted relationship with the endpoint device) can ensure localized secure machine learning of user behaviors in a manner that ensures all user metadata is secured from any unauthorized distribution.

Moreover, the network operating system in the network device (e.g., the endpoint device or the replicator device) can cause localized execution of AI-based agents that can provide improved operations for network-based services, including assistive user operations in an endpoint device based on the localized secure machine learning of user behaviors.

The improved operations also can include the network operating system (executed in a replicator device) maintaining anonymity of users of user endpoint devices that are generating search requests for search results via the secure peer-to-peer data network. The network operating system executed in the replicator device can anonymize search requests received from user endpoint devices, aggregate the anonymous requests into an aggregated search request, and split the aggregated search request into multiple anonymous projection searches into a sharded projection search space for distributed execution by multiple network devices.

The replicator device also can "scrub" any executable identifier from a data object received (or referenced) in a search result to generate a "safe" data object that cannot identify any user information sending anonymous projection searches based on the machine learning operations.

Hence, the example embodiments can ensure that each user can securely exploit machine learning of their own user behaviors as secure user metadata for enhanced and improved network services, including assistive network services such as autocorrect, conversation assist, automatic projection searches during user inputs, without any unauthorized distribution of the user behaviors to external entities that attempt to exploit user metadata for unauthorized monetization, targeted addictive content, etc.

A description will first be provided of the secure peer-to-peer data network, followed by a description of the local directory server and the network directory server that enable the management and searchability of network entities using different types of tag objects, according to an example embodiment.

Secure Private Core Network Overview

FIG. 1 illustrates a secure data network 5 comprising an example secure private core network 10, according to an example embodiment. The secure private core network 10 is: a (1) cloudless (2) hybrid peer-to-peer overlay network that (3) can utilize artificial intelligence (AI) to extend security features and operations beyond end-to-end encryption between two endpoint devices 12, for example wireless smartphone devices, wireless smart tablet devices, wireless Internet of Things (IoT) devices, etc. The secure private core network 10 comprises a master control program (MCP) device 14, and one or more replicator devices (e.g., "R1") 16. Each replicator device 16 can be connected to every other replicator device 16, forming a pairwise topology (e.g., a "mesh") 98 of interconnected replicator devices 16; each replicator device 16 also is connected to the MCP device 14; hence, each replicator device 16 provides a connection to zero or more endpoint devices 12 for reaching the MCP device 14 and/or another endpoint device 12, described in further detail below. The devices 12 also can have peer to peer connections to one another allowing direct communications without the aid of the core network 10 (hence the name hybrid peer to peer network). Devices 12 can simultaneously communicate either exclusively with each other, peer to peer, with some devices peer to peer and other devices via the core network 10 or with all other devices 12 via the core network 10.

The peer-to-peer network in the secure private core network 10 is based on a trusted aggregation of strict two-way trusted relationships ("cohorts") between two entities: an "entity" can be based on a physical device (e.g., an endpoint device 12 or a physical network device in the secure private core network 10 such as the MCP device 14) having a verified secure relationship with at least an individual person utilizing the physical device; the verified secure relationship also can be with an identified organization associated with the physical device (e.g., a prescribed manufacturer of an endpoint device 12 such as an IoT device, a service provider offering services based on purchase or rental of an endpoint device 12, etc.); the verified secure relationship also can be with another physical device attempting a communication with the physical device (e.g., a physical device executing the MCP device 14 and/or the replicator device 16, another endpoint device 12, etc.). Hence, the secure private core network 10 requires establishment of a strict two-way trusted relationship between two physical devices (also referred to as a "cohort"), where each physical device either is operated by a user, or is a physical device associated with an identified organization (including a corresponding physical device executing the MCP device 14).

Since an individual person (or identified organization) may utilize one or more endpoint devices 12 for network communications, the secure private core network 10 can identify an individual person (or identified organization) based on the allocation of a "federation" identifier (illustrated as "F1") 18 that has a verified secure relationship with one or more physical network devices (e.g., "A" 12, "A1"

12, etc.) that are utilized by the individual person (or identified organization) for communications within the secure data network 5; hence, the secure data network 5 also is referred to herein as a "secure peer-to-peer data network" based on the trusted aggregation of two-way trusted relationships. As described below, the federation ID 18 is generated by an endpoint device 12 during initial registration of a user (e.g., individual person or identified organization) using a secure random number generator that results in a universally unique identifier (UUID) of at least one-hundred twenty eight (128) bits: an example 128-bit UUID can be implemented as proposed by the Internet Engineering Task Force (IETF) (see RFC 4122).

Figure 2:
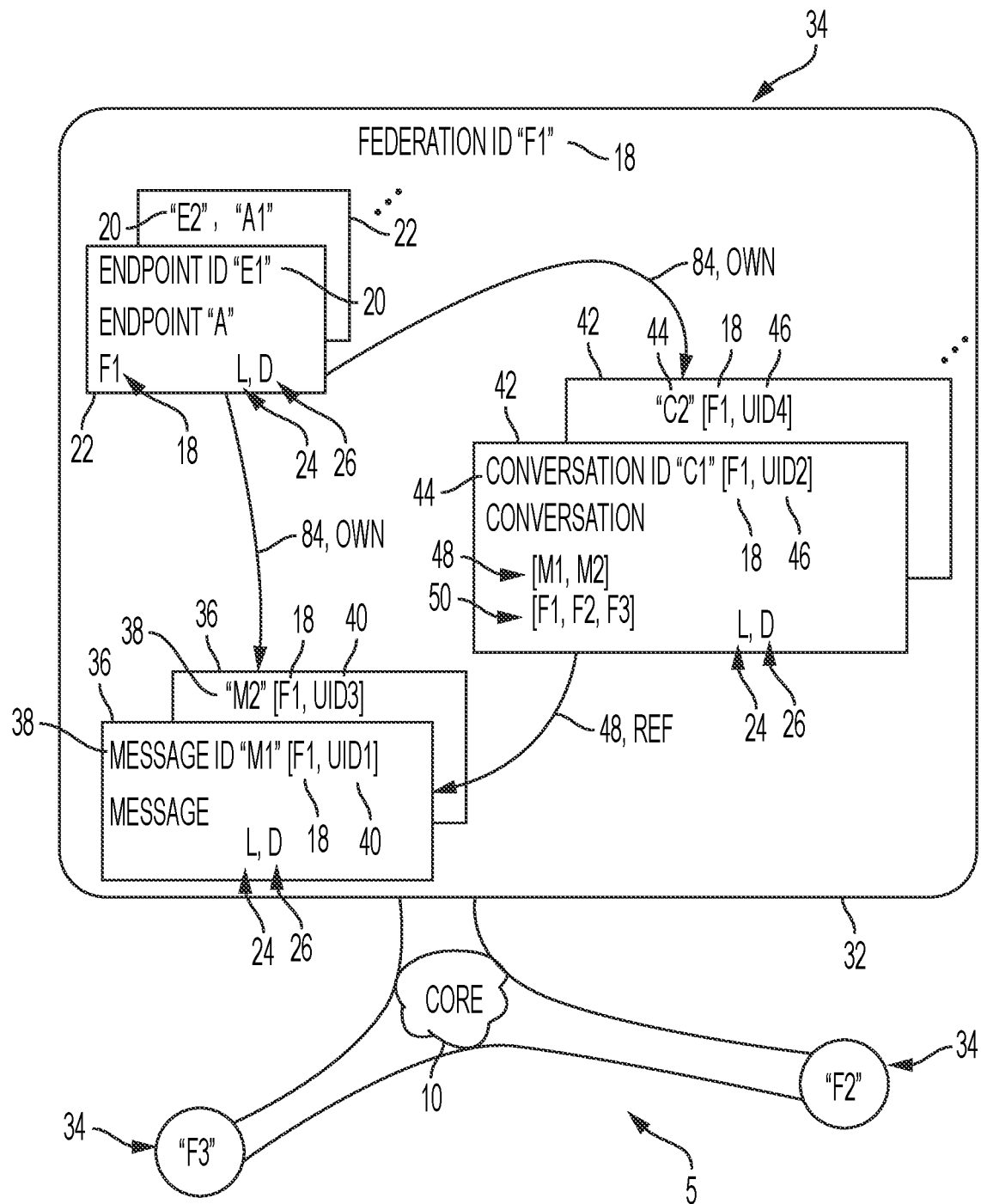
FIG. 2 illustrates example data structures generated and/or stored by an endpoint device associated with a federation identifier owned by a requesting user, for establishment and maintenance of two-way trusted relationships in the secure peer-to-peer data network, according to an example embodiment.

FIG. 2 illustrates example data structures that can identify secure relationships between different entities, for example different endpoint devices 12, different individual persons or organizations, etc. The secure private core network 10 causes each endpoint device 12 during registration with the secure private core network 10 to securely and randomly generate its own self-assigned 128-bit UUID as a unique endpoint identifier 20: the endpoint ID 20 is stored in a data structure referred to as an endpoint object 22 that stores all attributes associated with the corresponding endpoint device 12 in the secure data network 5. As illustrated in FIG. 2 and as described in further detail below, the secure private core network 10 can cause the endpoint device "A" 12 to generate its own endpoint identifier "E1" 20; the secure private core network 10 also can cause the endpoint device "A1" 12 to generate its own endpoint identifier "E2" 20. The endpoint ID 20 provides a permanent (i.e., unchangeable) cryptographically-unique identity for the endpoint device "A" 12.

Each physical device, including each endpoint device 12, is uniquely identified in the secure private core network 10 based on its corresponding endpoint object 22. The endpoint object 22 for each physical device can specify its corresponding endpoint ID 20, the federation ID 18 of the federation 34 to which the physical device belongs, a corresponding lifecycle policy "L" 24, and a corresponding distribution policy "D" 26, described below. The endpoint object 22 for each physical device also can identify a corresponding device type, for example a "human interface" (user interface device), a "thing" (e.g., IoT device, mass storage device, processor device), or a core network component (e.g., an MCP device 14, a replicator device 16, a directory server 28, a community server 30, etc.); hence, a particular device type as specified in the endpoint object 22 can cause the corresponding physical device (e.g., an endpoint device 12), to be allocated or granted selected attributes within the secure private core network 10. Each endpoint object 22 is securely stored in its corresponding physical device in which it represents, and also can be securely stored in other physical devices upon establishment of a two-way trusted relationship, described below.

A federation object 32 is a data structure that has its own unique federation ID 18 and comprises one or more endpoint objects 22: the federation object 32 is established upon secure registration of the first endpoint device 12 and establishment of its corresponding endpoint object 22. As described previously, an individual person (or identified organization) may utilize one or more endpoint devices 12 for network communications; hence, each endpoint object 22 is added to the federation object 32 in response to determining that the corresponding endpoint device (e.g., "A1") 12 has a two-way trusted relationship with a user (or organization) that has previously executed a secure registration with another endpoint device (e.g., "A") 12 in the same federation 32, described below. Hence, the secure private core network 10 can identify an individual person (or identified organization) based on a corresponding federation ID 18 that identifies a collection (i.e., "federation") 34 of one or more endpoint devices 12 having been verified by the secure private core network 10 as each having a secure relationship with the identified person or user.

Hence, a "federation entity" (or simply "federation") 34 as described herein is a logical entity in the secure data network 5, expressed in the secure private core network 10 by its corresponding federation object 32, that uniquely identifies the federation of secured endpoint devices 12 (identified by respective endpoint objects 22) that have a two-way trusted relationship with an individual user or organization. The secure private core network 10 establishes a trusted aggregation of strict two-way trusted relationships between two entities, where each endpoint device 12 of each federation 34 has its own permanent (i.e., unchangeable) and cryptographically-unique endpoint ID 20.

An endpoint device 12 in a federation 34 can generate content as a message object 36 that can be securely stored in one or more endpoint devices 12 in the federation 32. A message object can have different types including messages created within the secure private core network 10 (e.g., a notification object generated by an endpoint device 12 in the secure private core network 10), user created content from a user device 12 (e.g., a text message, an image, a media file, a media stream, etc.), or machine-created content from an IoT device (e.g., a sensor-based data record or media stream, an actuator message, etc.). A message object 36 is identified by a corresponding 256-bit unique message identifier 38 (illustrated in FIG. 2 as "M1" and "M2"): the message ID 38 comprises the federation ID 18 of the federation 34 in which the content was generated, and a corresponding 128-bit message UUID (e.g., "UID1") 40 that is generated by the endpoint device 12 in the federation 34 that generated the content. As described in further detail below, the generation of a message ID 38 that comprises the federation ID 18 provides an ownership reference 84 that establishes an absolute and exclusive ownership right in the content created by the federation 34, such that the content owner of the content in the message object 36 can be identified based on the federation ID 18 in the message ID 38. The message object 36 also can include a corresponding lifecycle policy "L" 24 (identifying for example an expiration date and time that identifies an instance that the associated content is to be automatically deleted from any physical storage device in the secure data network 5), and a corresponding distribution policy "D" 26 (identifying for example a distribution scope such as can only be shared by two users in succession, a distribution start or stop time for granting free access to media content for only one week before or after a concert performance date that is independent of replication of the media content throughout the secure data network 5, etc.). An endpoint device 12 in the federation 34 can distribute content that is stored in a message object 36 based on the endpoint device 12 generating a conversation object 42 comprising a conversation identifier (illustrated as "C1", "C2") 44 that comprises the federation ID 18 and a corresponding 128-bit conversation UUID (e.g., "UID2") 46 that is generated by the endpoint device 12 initiating the distribution of the content (i.e., initiating the "conversation"). The conversation object 42 can be of different types, for example a "post", a "community", a "vault" file system (for secure storage of selected messages at one or more locations). Each conversation object 42 can reference zero or more message objects 36, and therefore can optionally include a message reference 48 of one or more message objects (e.g., "M1", "M2"); each conversation object 42 also can include a subscriber list 50 specifying at least the federation ID 18 of the federation 34 that created the conversation object 42 (e.g., that created the content in the referenced messages "M1" and "M2" from the message reference 48). A given message (e.g., "M2") can be referenced in more than one conversation object (e.g., "C2"), enabling the message (e.g., "M2") to be replicated to different subscribers (e.g., federation "F2" 34 and federation "F3" 34) specified in the subscriber list 50 according to different policies specified by the corresponding lifecycle policy "L" 24 and the corresponding distribution policy "D" 26 in the conversation object "C2"; hence, the same message object 36 need not be duplicated as separate instances. Hence, a message ID 38 can be distributed according to different policies based on utilizing different conversation objects 42. Additional details regarding managing lifecycles for digital conversations can be found, for example, in U.S. Patent Publication No. 2021/0028940.

The federation object 32 can be implemented as a collection of the endpoint objects 22, message objects 36, and conversation objects that specify the same federation ID 18 as owner of the objects. In other words, the ownership within the same federation 34 is established based on storage of the same federation ID 18: within each endpoint object 22; within the message identifier 38 of each message object 36; and/or within the conversation identifier 44 of each conversation object 42. Hence, the federation object 32 can be implemented based on the federation ID 18 providing a reference to the owned endpoint objects 22, message objects 36, and conversation objects that can be stored at different locations within the memory circuit (94 of FIG. 4) of a physical network device; as a result, the federation object 32 need not be implemented as a discrete data structure that includes the owned objects 22, 36, and 38 stored therein.

Hence, each federation 34 in the secure data network 5 is a collection of one or more secured endpoint devices 12 (identified in the secure private core network 10 by its corresponding endpoint object 22) each of which have a two-way trusted relationship with an individual user or organization: each federation 34 is allocated a corresponding federation object 32 having a corresponding unique federation ID 18 that uniquely identifies the federation 34 in the secure data network 5. The federation object 32 can be stored in a memory circuit (94 of FIG. 4) of any one or more of the endpoint devices (e.g., "A") 12 of the federation "F1" 34.

An endpoint device "A1" 12 can initiate a prescribed secure salutation protocol with another endpoint device "A" 12 in order to establish a two-way trusted relationship between the two endpoint devices "A" and "A1" 12 in the federation "F1" 34, resulting in exchange of public encryption keys for pairwise sharing of encrypted content that cannot be decrypted by any intermediate device (e.g., a replicator device 16 in between two devices 12); hence, the addition of a new endpoint device (e.g., a new smartphone, a new smart tablet or laptop computer, etc. "A1") 12 by a user into the federation "F1" 34 enables the new endpoint device "A1" to execute a prescribed secure salutation protocol with at least one other endpoint device (e.g., endpoint device "A" 12), enabling the newly added endpoint device "A1" 12 in the federation "F1" 34 to establish a two-way trusted relationship with the other endpoint device (e.g., endpoint device "A" 12"). An example salutation protocol is illustrated in U.S. Patent Publication No. 2021/0029126.

The establishment of a two-way trusted relationship between the two endpoint devices 12 within the federation "F1" 34 enable the two endpoint devices 12 to execute autonomic synchronization of any portion of the data structures 22, 36, and 42 between any other endpoint device (e.g., "A1") 12 within the federation "F1" 34.

In particular, each physical network device (including each endpoint device 12) includes an autonomic synchronizer (52 of FIG. 1) that is configured for autonomically (i.e. automatically by a machine) synchronizing data structures between physical network devices that are trusted peer devices, for example between endpoint devices 12 that are identified as subscribers of the same conversation identifier 44 (based on the subscriber list 50): the autonomic synchronizer 52 can autonomically synchronize data structures between any pair of physical network devices having a two-way trusted relationship based on determining any differential hypercontent state (e.g., stored changes) between the stored data objects 22 identified in the message reference 48: the autonomic synchronizer 52 can reconcile any differential hypercontent state between any data objects 22 stored in different endpoint devices 12, resulting in updating the data objects 22 to a most recent version instantaneously in each endpoint device 12 connected to the secure data network 5; any disconnected endpoint device 12 can execute autonomic synchronization upon reconnection to the secure private core network 10, and/or in response to a local P2P (peer to peer) connection with a trusted peer endpoint device 12 (e.g., within its own federation 34 or another federation 34, as appropriate). Endpoint devices 12 within the same federation 34 also can execute autonomic synchronization of all data structures in the federation object 32 (including the federation object 32 itself), according to the policies set in the respective endpoint object 22. Hence, any endpoint device 12 (e.g., endpoint device "A1" 12) that is offline for some time interval can execute autonomic synchronization for updating of its stored content with the other endpoint devices 12 in its federation 34.

The autonomic synchronizer 52 is configured for executing pairwise synchronization between trusted peer devices 12 in response to each update to a data object. In particular, each and every data object that is created and stored in the secure data network 5 comprises a creation timestamp indicating a time that the data object was created, and a "last change" timestamp (i.e., update timestamp) indicating the last time the data object was updated. Hence, the autonomic synchronizer 52 can execute, in cooperation with a corresponding autonomic synchronizer 52 in a trusted peer device, a pairwise update of an older copy of each data object to the most recently available update based on comparing the relative update timestamps.

The autonomic synchronizer 52 of an endpoint device (e.g., "A") 12 utilizes a "database version number" for each other trusted physical network device (e.g., "A1", "R1", "B", "C", "MCP") in which the endpoint device "A" 12 has established a trusted relationship, resulting in a corresponding pairwise relationship in the database version number between trusted peer devices 12. In response to the trusted peer devices 12 connecting to each other (e.g., either directly via a P2P data link or via the secure private core network 10), the autonomic synchronizers 52 in the trusted peer devices 12 can track their respective database version numbers and in response can update their database versions along with the associated database changes.

Since different endpoint devices can be "online" or "offline" at different instances, a "disconnected" endpoint device (e.g., "A1") can develop changes or "versions" that "drift apart" from the synchronized versions among the trusted peer devices that are connected to the secure private core network 10, for example where a federation owner is updating a message object (e.g., a note or memorandum) 36 using the "disconnected" endpoint device (e.g., "A1"). Hence, the autonomic synchronizer 52 of an endpoint device (e.g., "B") 12 can respond to reconnection with the secure private core network 10 (or a trusted peer device 12 via a P2P data link) by comparing its "database version number" (e.g., the database version number associated with its peer "A") and determine if synchronization is needed.

The autonomic synchronizer 52 also can track changes of all locally-stored data objects based on creating a hash of a database state: the database state represents all locally-stored data objects as tuples of a data object identifier and the "last changed" timestamp. Example locally-stored data objects that can be generated by a federation owner on an endpoint device 12, and replicated and synchronized with other endpoint devices 12, can include: endpoint objects 22; conversation objects 42; message objects 36; outcasted endpoints, conversations and messages that are removed from a federation 34; membership of federations in conversations (e.g., subscriber lists 50); cohorts within a federation; voting state for conversations and messages; a vault file system within a federation; password recovery information for participants in password recovery; "shared" configuration between devices within a federation; etc.

Hence, any one or more of the endpoint devices 12 of a first federation (e.g., "F1") 34 can cause the secure private core network 10 to execute autonomic synchronization of any portion of the data structures 22, 36, and 42 in any other federation (e.g., "F2" or "F3") 34 in which the first federation has established a two-way trusted relationship, based on the subscriber list 50 in a given conversation object 42: the autonomic synchronization is executed in a secure manner that ensures that all data structures always stored securely in a non-transitory machine readable medium, and that all data structures are always transmitted securely, for example via a wireless (or wired) transmission medium.

For example, any data object (e.g., 22, 36, and/or 42) that is generated and stored within an endpoint device 12 (e.g., "A") can be encrypted using its public key (e.g., "KeyP1_A"); any data object that is sent from an originating endpoint device 12 (e.g., "A") to a cohort (e.g., "B") (either within its federation "F1" 34 or in another federation "F2" 34) for secure storage can be encrypted using the originator private key (e.g., "prvKeyP1_A") and the cohort public key (e.g., "Key_B"), and further encrypted using a temporal key prior to transmission to the cohort. The cohort can decrypt the transmitted data object based on the temporal key (described below) and store the object that was encrypted using the originator private key (e.g., "prvKeyP1_A") and the cohort public key (e.g., "Key_B").

As described below, the verified secure relationship is established via a "two-way trusted relationship" that is verified by the MCP device 14 via the first party (e.g., an individual person, organization, or another physical device) and via the second party (e.g., via the physical network device); in other words, no third-party authentication (e.g., by a certifying authority outside the authority of the secure private core network 10) is permitted in the secure private core network 10, nor is any one-way verification permitted in the secure private core network 10; hence, the trusted aggregation of multiple two-way trusted relationships establishes the hybrid peer-to-peer overlay network in the secure private core network 10.

Figure 3:
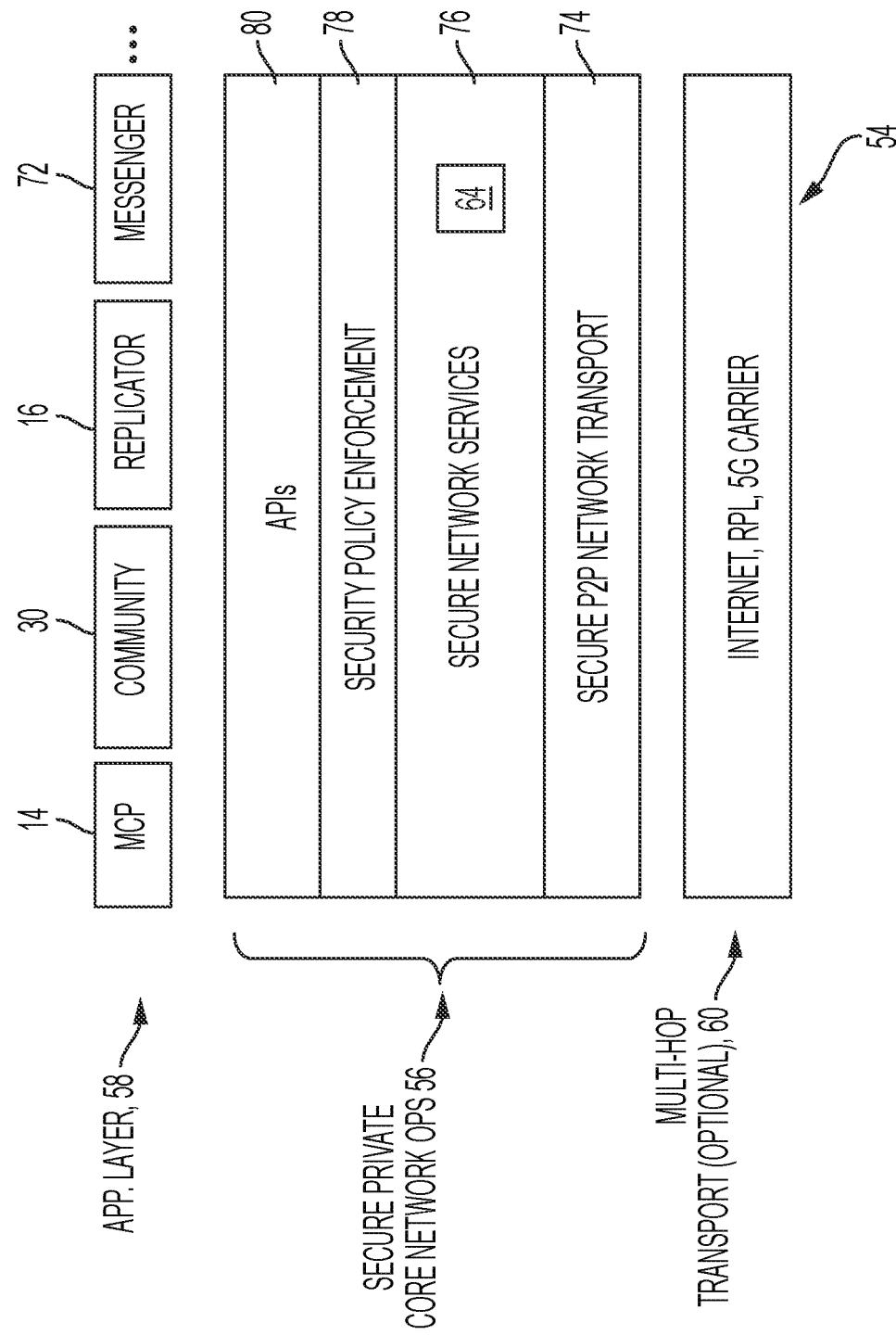
FIG. 3 illustrates an example implementation in an apparatus of executable code configured for providing operations for deployment of the secure peer-to-peer data network, according to an example embodiment.

FIG. 3 illustrates an example implementation 54 in a physical network device (e.g., an endpoint device 12) for deployment of the secure data network 5 in a physical data network, according to an example embodiment. The example implementation 54 includes execution of secure private core network operations 56, and execution of selected application layer resources 58 for formation of the secure data network 5. For example, the application layer resources 58 can include executable application code that causes a physical network device to selectively execute element-specific operations within the secure private core network 10, for example an MCP device 14, a replicator device 16, a community server 30; as shown in FIG. 1, additional application layer resources 58 that can be deployed in the secure private core network 10 by a physical network device (e.g., an endpoint device 12) can include a directory server 28 (hosted in the same network executing the MCP device 14), a community server 30 (hosted in the same physical network device executing the MCP device 14), and a load balancer 62 for allocating each endpoint device 12 to a replicator device 16. The application layer resources 58 also can include a messenger application 72 that enables a user of an endpoint device 12 (e.g., a 5G smart phone) to send and receive content using conversation objects 42, for example in the form of instant messages, public/private forum posts, etc. An example of the messenger application 72 is the commercially available application "Society" from WhiteStar Communications, Inc., Durham, North Carolina, at the website address "https://societyapp.io/".

The secure private core network operations 56 can be executed by each of the physical network devices in the secure data network 5 (including each of the endpoint devices 12) executing machine-executable code that can be implemented in each physical network device in the form of a self-contained "network operating system" (NOS) 56. The "network operating system" 56 can be implemented for deployment on various network device platforms, for example as a native operating system (e.g., for an IoT device or a physical network device dedicated for use in the secure data network 5), or as an executable "app" that can be installed and executed on a device utilizing an operating system such as Android, iOS, Microsoft Windows 10, or any other Unix-based operating system.

The network operating system 56 can include machine-executable code for executing numerous security-based operations in the secure data network 5, including establishment of a secure peer-to-peer (P2P) network transport 74 based on a dynamic generation of a unique encrypted temporal key for each and every data packet that traverses the secure data network 5, providing secure network services 76, providing security policy enforcement 78, and providing application programming interfaces (APIs) 80.

Figure 7:
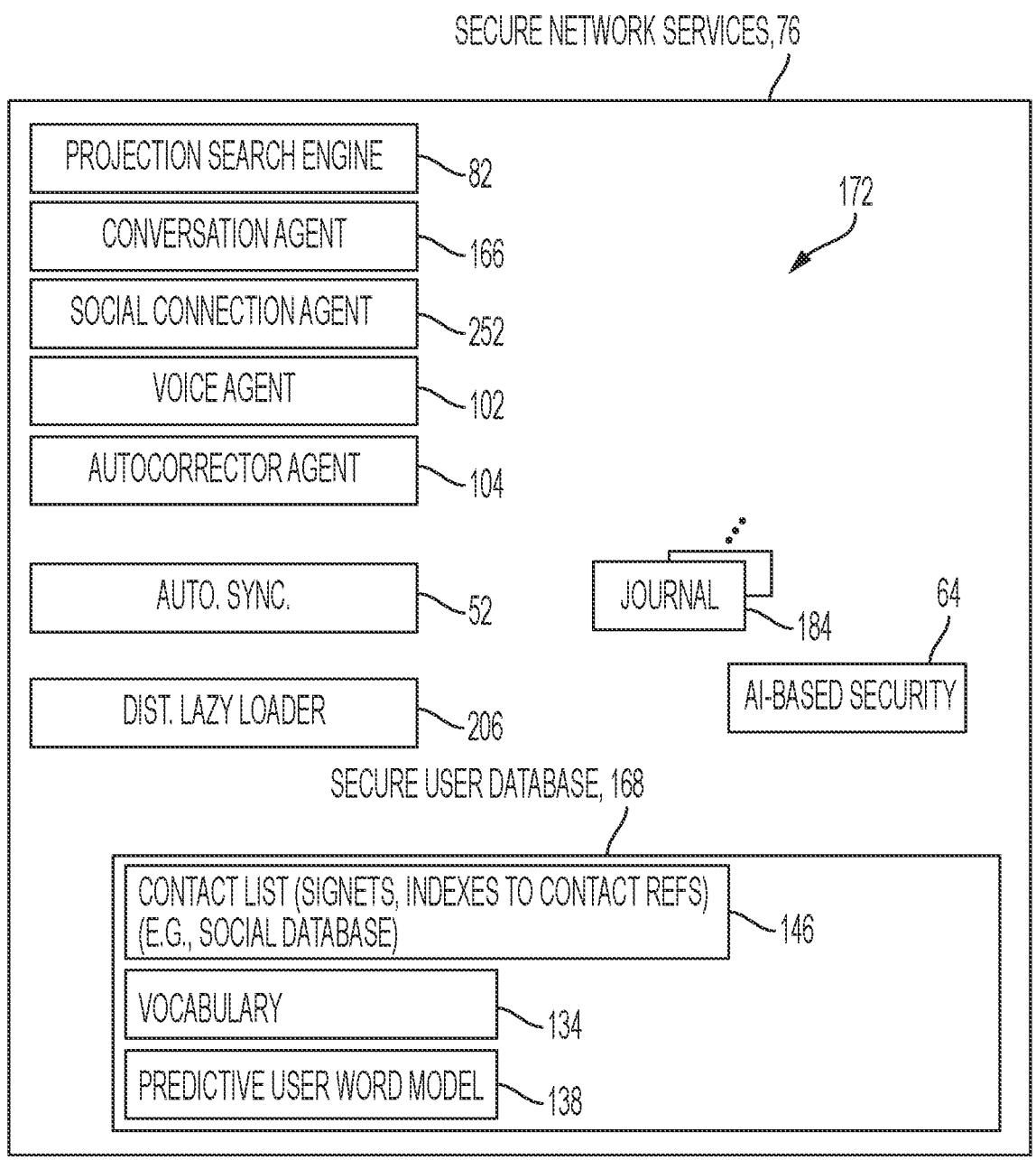
FIG. 7 illustrates in further detail the secure network services layer of the network operating system of FIG. 3, including localized secure machine learning of user behaviors for enhanced secure services in the secure peer-to-peer data network based on a secure user database in the network operating system that is exclusively owned and controlled by the user, according to an example embodiment.

Example secure network services 76, illustrated in FIGS. 1, 3, and 7, can include machine-executable code for executing an Artificial Intelligence (AI) based security service 64 that comprises a guardian service 66, a sentinel service 68, and a navigator service 70. Additional example secure network services 76 can include machine-executable code for executing a prescribed secure salutation protocol with another physical network device (e.g., another endpoint device 12) for establishment of a secure two-way trusted relationship, executing management of messages or conversations (e.g., according to a lifecycle policy "L" 24 and/or a distribution policy "D" 26), executing management of secure and permanent deletion of data objects or an endpoint device 12 from the secure data network 5 ("zeroization"), account management, etc. Another example secure network service 76, illustrated in FIG. 1, includes machine-executable code for executing a distributed search (DS) agent 82:

the distributed search (DS) agent 82 can execute AI analytics and generate metadata for AI operations; the distributed search (DS) agent 82 is configured for generation and selected synchronization of "projections" with other distributed search (DS) agents 82 that enable real-time searches to be executed by any endpoint device 12, an MCP device 14, any replicator device 16, a directory server 28 or community server 30, and/or any of the components or executable agents of the AI-based security service 64.

The APIs provide prescribed commands that are available to the application layer resources 58 for execution of the secure private core network operations 56; moreover, the APIs 58 separate application logic from the need for any domain knowledge of the underlying data network that is implementing the secure data network 5. Hence, the example implementation 54 enables application developers to create the application layer resources 58 without any need of domain knowledge, and without any need to learn any security-based protocols, since the secure private core network operations 56 can ensure that the secure data network 5 provides a secure network that can prevent network intrusion.

A problem in prior deployments of cyber security is that no known security system for a user network device maintained cryptographic security of a data packet having an encrypted payload that is received via a data network. To the contrary, at most a resource in a user network device would decrypt the encrypted payload to recover a decrypted payload, and store the decrypted payload as a local data structure in a memory circuit of the user network device. Hence, the storage of the decrypted payload "at rest" within a memory circuit of the user network device exposed the decrypted payload to a potential cyber-attack.

Although existing encryption applications enabled a user to execute encryption of locally-stored data structures on his or her user network device, such encryption applications are executed at the "application layer", resulting in the exposure of the decrypted data packet at the operating system level until a user executes the encryption application in the user network device for encryption of the locally-stored data structures.

Access to the secure private core network 10 by any physical network device 88 requires installation and instantiation of the network operating system 56. Further, the network operating system 56 operates as a secure executable container that only allows access to an internal executable code, access to an "at-rest" or "in-flight" stored data structure, or access to the secure data network 5 only via one or more of the prescribed APIs 80.

Hence, the network operating system 56 prevents any executable resource in a physical network device 88 (or a user of the physical network device 88) from accessing any unencrypted form of any "at-rest" first secure data structures encrypted and stored by the network operation system 56 in the physical network device 88, without authorized access via a prescribed API 80. The network operating system 56 also prevents any executable resource in the physical network device 88 (or a user of the physical network device 88) from accessing any unencrypted form of any "in-flight" second secure data structures encrypted and stored by the network operation system 56, without authorized access via a prescribed API 80. The network operating system 56 also prevents any executable resource in the physical network device 88 (or a user of the physical network device 88) from accessing the secure peer-to-peer data network, without authorized access via a prescribed API 80 required by the network operating system 56.

Hence, the network operating system 56 establishes a "closed" access system that requires authorized access via one or more of the APIs 80.

As illustrated in FIG. 3, the example implementation 54 also can optionally include a multi-hop transport layer 60 that enables the secure data network 5 to be deployed overlying an existing network infrastructure, for example the Internet or another multi-hop data network (96 of FIG. 5), for example a private network provided by a wireless 5G service provider (e.g., Verizon, AT&T, etc.), or a private network constructed according to an alternative multi-hop protocol such as the Routing Protocol for Low Power and Lossy Networks (RPL) according to the Internet Engineering Task Force (IETF) Request for Comments (RFC) 6550. Hence, the secure data network 5 can be deployed as a private network (e.g., by a 5G service provider or a RPL-based network) for use by private subscribers, without any data traffic exposed to the Internet. The secure data network 5 also can be deployed, however, from the "ground up" based on an aggregation of multiple trusted P2P connections using the secure P2P network transport 74 across multiple physical network devices establishing a mesh of peer to peer connections via the pairwise topology 98 of replicator devices 16, resulting in the potential deployment of a worldwide deployment of a secure data network 5, without the Internet.

The security policy enforcement 78 provides an enforcement of application-level and user level "manners and semantics" that ensures compliance with digital rights and user relationship rights in the secure private core network 10. In one example, if an errant application (or user) attempted to modify content it did not have rights to (e.g., a user in the federation "F2" 34 attempted to modify content in a message ID 38 generated by the user of the federation "F1" 34 as identified by the federation ID "F1" 18 in the message ID 38), the security policy enforcement 78 can block the attempt to modify the content. As apparent from this example, the security policy enforcement 78 can prevent unauthorized manipulation of media content that has resulted in a proliferation of "deep fake" videos.

The security policy enforcement 78 also provides an enforcement of user digital rights, where at any time a user in the federation "F1" 34 can amend or delete instantaneously any one content item owned by the user (i.e., that includes the corresponding federation ID "F1" as part of its message ID 38): the security policy enforcement 78 can cause all autonomic synchronizers 52 that have a cohort relationship with the federation "F1" to instantly amend or delete the content item identified by its message ID 38.

The security policy enforcement 78 also can enforce various trust levels between an identified cohort, for example a progression from a transient trust (based on location proximity or common interests) to a permanent trust relationship; the security policy enforcement 78 also can enforce a revoked trust ("outcasting"), where the security policy enforcement 78 can respond to a user of the federation "F1" 34 wishing to revoke a relationship with the user of the federation "F2" 34; in this case, the security policy enforcement 78 can provide various warnings regarding revoking a relationship ("outcasting"), including loss of shared data, loss of shared contacts, etc.; as such, the security policy enforcement 78 can encourage dispute resolution between two parties to encourage that societal contracts are fulfilled.

The security policy enforcement 78 also can enforce proper semantic behaviors in the secure private core network 10, including ensuring API calls (by the APIs 80) are presented in the appropriate sequence (i.e., not out-of-order), and that a user of a federation 34 performs social-based operations in the secure private core network 10 in the appropriate order, e.g., a user cannot "join" a conversation without having been invited to join the conversation, and a user cannot "leave" a conversation without first being joined as a member, etc.

Hence, the example implementation 54 can ensure reliable establishment of cohorts, and can enforce security policies that ensure preservation of media rights and maintaining mutual trust between users via their federations 34.

A fundamental problem in the Internet is that prior to deployment of Dynamic Host Configuration Protocol (DHCP), IP addresses at first were allocated (in prescribed address ranges or "blocks") to organizations, and specific IP addresses could be fixed to a specific location (e.g., an office); hence, an Internet Protocol (IP) address had been used to identify a business, a business location (e.g., office location), a person (e.g., an individual utilizing an office having a network connection), and/or a physical network device (e.g., a personal computer operated by the person within the office and utilizing the network connection). However, the use of DHCP, NAT/PAT, wireless access on a guest network, etc., demonstrates than an IP address does not, in fact, accurately represent any one of a business, a location, a person, or a physical network device.

Another fundamental problem in the Internet is that it is built from its Border Gateway Protocol (BGP) core outward to BGP peers that operate as respective Autonomous Systems (ASs), to establish a BGP mesh network, each AS subdividing out from there toward a network edge; hence, a network is not considered "converged" until any one IP address (source address) can route a data packet to any other destination IP address. In addition to causing scaling problems as more networks and more devices are added to the Internet, this universal reachability from any source IP address to any destination IP address also introduces severe security threats since any "threat device" originating at a "source" IP address can threaten any "target device" at a "destination" IP address. In other words, anyone can obtain unrestricted access to the Internet via a threat device using a "source" IP address, and target devices at destination IP addresses need to expend significant resources to prevent intrusion by the threat device.

These security threats are magnified by orders of magnitude by cloud computing services using data centers worldwide for replication of data for cloud-based services: a successful attack on any one of the millions of IP addresses in use by a cloud computing service has the potential to disrupt the entire worldwide cloud computing service for millions of customers of the cloud computing service. Attempts to implement a "zero trust network" (e.g., at a utility company, a gas pipeline company, etc.) in order to avoid a cyber-attack are ultimately ineffective because a "threat device" still has Internet-based access to numerous entry points within the "zero trust network", which can be in the range of millions of IP addresses that the zero trust network relies on for cloud-based services: in other words, a zero trust network utilizing cloud-based services can have an attack surface area of over one million IP address.

The secure private core network 10 is implemented with the following security features and operations: the secure private core network 10 can provide full privacy for each endpoint device 12; the secure private core network 10 can ensure free association of users or their associated endpoint devices 12 (i.e., no third party can force a disassociation or disconnection between two associated users that have formed an association between each other); the secure private core network 10 can enable the protection of ownership of all content by users (i.e., user content cannot be "stolen" by another user); and the secure private core network 10 can eliminate the necessity for centralized services, controls, costs, such as found in a cloud-based computing system. The secure private core network 10 also can prevent unauthorized monetization of users' data, and also can facilitate integrated money exchange.

The secure private core network 10 is implemented as a hybrid peer-to-peer overlay network that does not contain any centralized controls as found in a cloud-based computing system; to the contrary, the secure private core network 10 can be composed based on aggregating a large number of small, decentralized, networks that are built by endpoint devices 12 at the "edge" of the network. Moreover, the secure private core network 10 can inherently implement security as a core policy (i.e., a "base tenant" of the secure private core network 10), where each decentralized network has a limited number of network nodes, and every user must "opt-in" before communicating with another network node.

Hence, the secure private core network 10 can initiate a two-device secure data network 5 between two endpoint devices 12 (e.g., between two individuals sharing data between two smart phones via a P2P link), and can aggregate additional devices 12 for eventual formation of a worldwide secure data network.

The secure private core network 10 comprises a single MCP device 14 that is implemented by a physical network device (e.g., an endpoint device 12) such as a user device, or a high-end computing device (e.g., a server device owned by a private network provider such as a 5G service provider, etc.) executing the executable application resource "MCP" 58 illustrated in FIG. 3; in other words, the MCP device 14 can be deployed as an executable application layer resource 58 that can be executed on any physical network device. In one example, a user device (e.g., a 5G smart phone) can initiate execution of the application resource "MCP" 58 (overlying the 5G smart phone execution of the secure private core network operations 56 as a "network operating system" app) for establishment of the secure data network 5 as a private peer-to-peer network in an isolated region that has a limited number of users (e.g., around twenty users in an isolated region that has no connection to a 5G service provider network or wide area network).

The MCP device 14 operates as a prescribed management agent in the secure peer-to-peer data network 5. Hence, only one MCP device 14 is executed in the secure data network 5 at a given time, even though an isolated secure data network 5 can have its own MCP device 14: hence, a physical network device must halt execution of its MCP device 14 prior to joining another secure data network 5 (e.g., executing a merge operation with a larger, pre-existing secure private core network 10 hosted by a 5G service provider). The MCP device 14 can manage subscriptions and registrations by individuals or businesses to the secure data network 5, accounting, load balancing (executed by the load balancer 62), endpoint-replicator assignment (including tracking endpoint—replicator connections for replicator queries), and software update compatibility enforcement. The MCP device 14 also can coordinate with AI-based assist operations provided for example by the AI-based security service 64 (e.g., connection assist using the navigator service 70, salutation assist, conversation assist using the community server 30, revocation assist, zeroization assist, etc.).

The MCP device 14 is connected to each and every replicator device 16, and can maintain a mapping of every endpoint device 12 to a state (either offline or connected to an identified replicator device 16).

The replicator device 16 can be deployed as an executable application layer resource 58 that can be executed on any physical network device. Each replicator device 16 can establish a secure two-way trusted relationship with the MCP device 14 using a prescribed secure salutation protocol that includes negotiation of a public key pair; each replicator device 16 also can establish a secure two-way trusted relationship with all other available replicator devices 16 (using a prescribed secure salutation protocol that includes negotiation of a public key pair) to form a pairwise topology 98 (i.e., one logical hop between each replicator); each replicator device 16 can provide connections between endpoint devices 12 using various secure network transport operations, including crypto-signed switching described below. Hence, each endpoint device 12 can be connected to another endpoint device by zero logical hops (pure peer-to-peer (P2P) connection "A-A1" in FIG. 1), one logical hybrid P2P hop (e.g., "B-R100-C"), or two-logical hybrid P2P hops (e.g., "A-R1-R100-B"). Each logical connection is based on a first party trusted relationship established by a replicator (e.g., replicator device "R1" 16) and its peer replicator (e.g., replicator device "R100" 16). Replicator devices 16 each include a flow table (forwarding information base) for forwarding received packets after packet authentication.

The directory server 28 can be executed by MCP device 14. The directory server 28 is configured for managing ontologies of data structures (e.g., caching intermediate results), storing tags, federation IDs etc. (for projections, e.g., parallel searches by the distributed search (DS) agent 82 of one or more physical network devices such as endpoint devices 12).

The community server 30 can be executed by the MCP device 14 and/or any endpoint device 12; the community server 30 is configured for hosting posts within a public and/or private community in the secure private core network 10.

The guardian service 66 can be executed as part of the secure network services 76 and can manage protection of data during transmission or reception ("in-flight") and while stored on a machine-readable non-transitory storage medium ("at rest"), including maintaining persistence of endpoint objects 22, conversation objects 42, and message objects 36 according to the associated lifecycle policy "L" 24 and distribution policy "D" 26.

The navigator service 70 can be executed as part of the secure network services 76 and can manage connectivity graphs for how to connect cohorts; the navigator service 70 also can warn the sentinel service 68 of detected threats, and the navigator service 70 can respond to threats detected by the sentinel service 68.

The sentinel service 68 can be executed as part of the secure network services 76 and can detect threats in real time, mitigate against detected threats (e.g., warning user, automatic mitigation operations, etc., notifying the navigator service 70), etc.

The guardian service (i.e., guardian security agent) 66, sentinel service (i.e., sentinel security agent) 68, and navigator service (i.e., navigator security agent) 70 executed as part of the AI-based security service 64 in the secure network services 76 are scalable in that every physical network device can execute the various services 66, 68, and 70 at a scale corresponding to the associated application operations 58 of the physical device executing the associated application layer resources 58; hence, executable agents 66, 68, and 70 operating in one endpoint device (e.g., "A" 12) can securely communicate and share metadata (e.g., feature data such as cyber-attack feature data, wireless network feature data, etc.) with agents operating in other physical network devices (e.g., "R1", "R100", the MCP device 14, endpoint device "B" 12) to localize and identify potential threats and prevent any attacks within the secure private core network 10. Hence, the AI-based security service 64 can manage user metadata in order to enhance user security, as opposed to monitoring user metadata for monetizing.

The distributed search (DS) agent 82 can execute projections: in relational algebra a projection refers to a subset of columns of information; hence, a distributed search (DS) agent 82 can apply a subset of information from a data structure (e.g., a federation ID 18, endpoint ID 20, message ID 38, conversation identifier 44, endpoint object 22, message object 36, conversation object 42 or a hypercontent component thereof), to decompose a mapping of a database lookup into a set of queries and subqueries; the generation of a projection enables execution of parallel distributed searches. A projection can be created by a distributed search (DS) agent 82 executed by any physical network device within the secure data network 5. A projection generated by a distributed search (DS) agent 82 can have a defined scope (or "extent"), for example, local, within a federation 34, within a conversation, global, etc.; a projection also can have different types (e.g., one-time, until a deadline, etc.), and can be named with arbitrary names (e.g., contact lookup, signet scan, etc.). Each projection defines an arbitrary number of "projection entries" that are used to match fields using various search techniques, and to select which fields associated with the matches should be returned; the fields can be arbitrary types of information in the secure data network 5 (e.g., signet, endpoint ID 20, email address, tag, message ID 38, conversation identifier 44, titles, names, hypercontent, URLs, etc.), and the values for matches can be exact matches or regular expressions ("regex") comprising a sequence of characters that have a matching pattern. Each projection entry can select a number of fields that should be returned when matches select information: if no matches are found for a projection entry then no record is returned; for matches, values for the fields selected are returned along with the associated projection entry tag.

Hence, a distributed search (DS) agent 82 can execute a projection that has a scope that limits the extent of a search: the scope can be limited at different locations: for example a scope can limit a search by an endpoint device 12 to a common word usage, old passwords, etc.; a scope can limit a search by a replicator device 16 to GIF image searches, for example; a scope can limit a search by the MCP device 14 to limited fields to preserve privacy of users of the endpoint devices 12, for example limiting searches to a hash of a user email (and not the actual email which is not made available to the MCP device 14), federation ID 18, endpoint ID 20; a scope also can limit a search by the directory server 28 and/or the community server 30. Projections can be executed once, continuously, periodically, until a prescribed "event" deadline (e.g., time expiration, project deadline reached, etc.).

A distributed search (DS) agent 82 also can obtain metadata from other agents executed in the secure private core network 10 to extract feature graphs for assistance in AI-based decisions such as recommendations whether to accept connection requests or conversation requests, keyboard word suggestions, etc.

Hence, the implementation of the secure private core network 10 as a cloudless hybrid peer-to-peer overlay network enables every person and every device to be securely connected, and as such is a realization of "Metcalf's Law" that the value of a telecommunications network is proportional to the square of the number of connected users of the system. The implementation of the secure private core network 10 as a cloudless hybrid peer-to-peer overlay network can extend security features and security operations that mimic social networks without technical constraints, and the use of AI enables the secure private core network 10 to fit policy and interaction requirements of individual users (i.e., people), as opposed to requiring people to adapt to technical constraints.

Hence, the aggregation of two-way trusted relationships in the secure private core network 10 ensures that any attack surface area within the secure data network 5 is limited to two devices at any time, requiring any "threat device" to successfully hack the secure keys of the two peer devices before being able to compromise only the pairwise-encrypted content shared only between the two peer devices; hence, any further attack would require the threat device to successfully hack a next pair of secure keys, etc.

The secure private core network 10 also can include a sensor network comprising one or more sensor devices (e.g., Internet of Things-based sensor devices): each sensor device has a trusted relationship with at least another sensor device, or a trusted relationship with another entity that enables the sensor device to associate with a single individual, a PAN, a room area network, etc.

Depending on implementation, the secure data network 5 can be established as an aggregation of decentralized secure networks. Each decentralized network can be connected to another decentralized network by one or more private dedicated optical fiber connections ("dark fiber pairs") that are part of a private backbone network: the private backbone network can utilize one or more optical network carriers on diverse fiber paths in order to provide a regionally redundant connectivity over large geographic areas (e.g., providing connectivity between eastern United States, southwest United States, Midwest United States, etc.). Sub-oceanic fiber paths and/or satellite communications also can be used to extend the private backbone network in one geographic region to a worldwide private backbone network. The private backbone network also can be managed by a "bare metal infrastructure" where any server devices executing any network-based operations are single-tenant server devices, i.e., the server devices are reserved for the exclusive use of the private backbone network only, with no use by a third-party tenant permitted (as opposed to existing cloud computing systems that can "share tenants" on a single network device). Further, all data in the private backbone network is always encrypted by default, regardless of whether the data is stored on a non-transitory machine-readable storage medium (i.e., "at rest"), or whether the data is undergoing wired or wireless transmission (i.e., "in transit").

Hardware Device Overview

Figure 4:
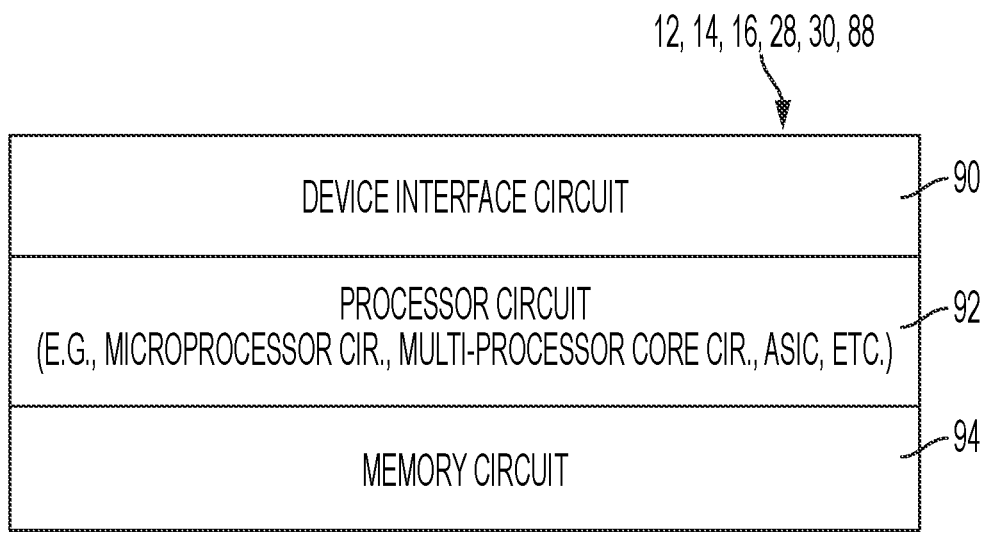
FIG. 4 illustrates an example implementation of any of the network devices described with reference to any of the Figures, according to an example embodiment.

FIG. 4 illustrates an example implementation of any one of the physical network devices shown in any of the other Figures (e.g., 12, 14, 16, 28, 30, and or 88 of FIGS. 1, 2, and/or 6), according to an example embodiment.

Each apparatus (e.g., 12, 14, 16, 28, 30, and or 88 of FIGS. 1, 2, and/or 6) can include a device interface circuit 90, a processor circuit 92, and a memory circuit 94. The device interface circuit 90 can include one or more distinct physical layer transceivers for communication with any one of the other devices (e.g., 12, 14, 16, 28, 30, and or 88); the device interface circuit 90 also can include an IEEE based Ethernet transceiver for communications with the devices of FIG. 1 via any type of data link (e.g., a wired or wireless link, an optical link, etc.). The processor circuit 92 can be configured for executing any of the operations described herein, and the memory circuit 94 can be configured for storing any data or data packets as described herein.

Any of the disclosed circuits of the devices (e.g., 12, 14, 16, 28, 30, and or 88) (including the device interface circuit 90, the processor circuit 92, the memory circuit 94, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 94) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 94 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 94 can be implemented dynamically by the processor circuit 92, for example based on memory address assignment and partitioning executed by the processor circuit 92.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Identity Management System Forming Two-Way Trusted Relationships

The example embodiments enable the secure establishment of universally-unique identities in a secure peer-to-peer data network 5 that is established based on an aggregation of two-way trusted relationships, all under the control of the AI based security suite 64. The secure establishment of universally-unique identities is based on establishing a unique federation identifier for a "requesting party" (e.g., user, business entity, etc.) once a two-way trusted relationship has been established between the requesting party and the secure peer-to-peer data network, and establishing a permanent and unique endpoint identifier for a network device used by the requesting party for joining the secure peer-to-peer data network. The endpoint identifier is associated with the federation identifier to establish that the requesting party has ownership of the corresponding network device, where the "ownership" establishes a two-way trusted relationship between the requesting party and the corresponding network device based on the requesting party retaining possession and control of the network device; hence, the endpoint identifier (associated with the federation identifier) can uniquely identify the network device in the secure peer-to-peer data network as an "endpoint device" that is associated with the requesting party based on a two-way trusted relationship between the requesting party and the endpoint device.

The requesting party can add additional network devices as distinct endpoint devices that are associated with the federation identifier based on a corresponding two-way trusted relationship between the requesting party and the corresponding network device, under the control of the AI based security suite. Hence, a requesting user can aggregate a "federation" of trusted endpoint devices for use within the secure peer-to-peer data network.

Moreover, each endpoint device can uniquely and securely identify itself based on the AI based security suite cryptographically generating a secure private key and a corresponding secure public key associated with the requesting party utilizing the endpoint device. Hence, data storage in each and every network device in the secure peer-to-peer data network, as well as all network communications between each and every network device, can be secured by the guardian security agent based on sharing secure public keys between endpoint devices having established a two-way trusted relationship based on a secure verification of membership within the same "federation" according to a prescribed secure salutation protocol under the control of the AI based security suite.

The following description summarizes the establishment of the secure peer-to-peer data network 5 as a trusted aggregation of two-way first-party trusted relationships, also referred to as "cohorts". Each two-way first-party trusted relationship requires a requesting party "X" to send a relationship request directly to a recipient party "Y" (the first "way" of the two-way first-party trusted relationship), i.e., no "requesting agent" can act on behalf of the requesting party "X" without explicit authorization from the requesting party "X" to send the request; similarly, no "receiving agent" can act on behalf of a recipient party "Y" without explicit authorization from the recipient party "Y". The relationship request can include a secure public key "Key_X" associated with the requesting party "X" (i.e., the requesting party "X" owns a private key "prvKey_X" corresponding to the secure public key "Key_X"), as opposed to relying on any trust in a secure certificate issued by a third party certifying authority. The recipient party "Y" can decide to accept the request or deny the request; if the recipient party "Y" decides to accept the relationship request, the recipient party "Y" can store the secure public key "Key_X" and send to the requesting party "X" an acknowledgment that contains the secure public key "Key_Y" of the recipient party "Y" (i.e., the recipient party "Y" owns a private key "prvKey_Y" corresponding to the secure public key "Key_Y"). The acknowledgment can be encrypted using a temporal key generated by the recipient party "Y": the recipient party can encrypt the temporal key using the secure public key "Key_X", and add to the encrypted acknowledgment (containing the secure public key "Key_Y") the encrypted temporal key. Encryption can be executed, for example, using data encryption standard (DES), TripleDES, RSA, Advanced Encryption Standard (AES), ECIES, etc.

Hence, the requesting party "X", in response to receiving the encrypted acknowledgment containing the encrypted temporal key, can recover the temporal key based on decryption using the corresponding private key "prvKey_X", and decrypt the encrypted acknowledgment using the recovered temporal key to obtain the secure public key "Key_Y". Hence, the two-way first-party trusted relationship between the parties "X" and "Y", or "cohort" between "X" and "Y", can be securely maintained based on the secure storage of data ("at rest") using the key pairs "Key_X" and "Key_Y"; secure communications between the endpoint devices 12 associated with the cohort "X" and "Y" also can be secured based on encrypting each data packet prior to transmission using a temporal key, where the temporal key also is encrypted (using the key of the destination device) to form an encrypted temporal key that is supplied with the encrypted data packet for decryption at the destination.

The aggregation of cohorts between two endpoint devices 12 (pairs of pairs of pairs) ensures that the attack surface area in the secure data network 5 is no more than two ("2") devices, regardless of the size of the secure data network 5. Use of encrypted temporal keys ensures that every transmitted data packet has a different key needed for decryption following transmission. Every data structure stored in the secure data network 5 has a different encryption with a different key, such that the "prize" for hacking a stored data file is only the one hacked data file.

Figure 5:
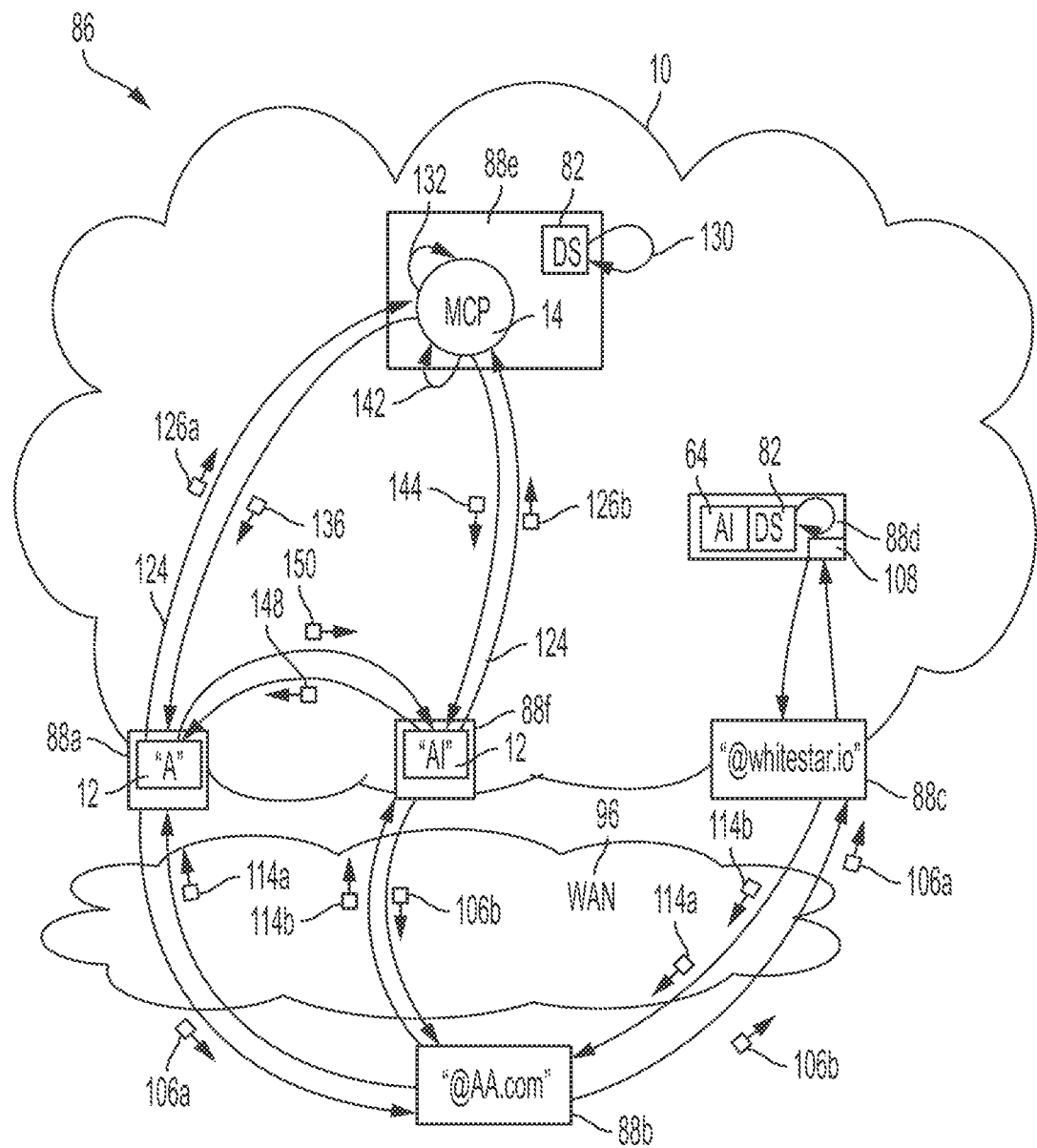
FIG. 5 illustrates in further detail interactions between user-controlled network devices, server network devices in an external data network, and one or more server network devices in the secure peer-to-peer data network, in establishing a two-way trusted relationship for creation of a federation identifier in the secure peer-to-peer data network for the requesting user and an endpoint identifier associated with the federation identifier for each endpoint device of the requesting user, according to an example embodiment.

FIG. 5 illustrates an example identity management system 86 that can be implemented in the secure private core network 10 for secure establishment of trusted relationships in the secure data network 5, according to an example embodiment. A new subscriber "P1" can operate his or her physical network device (88a of FIG. 5) to cause the processor circuit 92 of the physical network device 88a to download and install, for example via an external data network 96 distinct from the secure peer-to-peer data network 5, an executable application (e.g., an "app") that includes a desired application (e.g., a messenger application 72 of FIG. 3) and the network operating system (NOS) 56. The new subscriber "P1" as a "requesting party" can enter via the device interface circuit 90 of the physical network device 88a a command that causes the processor circuit 92 to start ("instantiate") the executable application executing the secure private core network operations 56 on the physical network device 88a as an endpoint device "A" 12, causing an account management service executed in the secure network services 76 to prompt the new subscriber "P1" to register by entering an external network address such as a valid email address of the new subscriber "P1" (e.g., "P1@AA.com"), a mobile number used to receive text-based or image-based messages, etc., where the external network address is used by the requesting party "P1" for reachability via an external data network 96 distinct from the secure peer-to-peer data network 5.

In response to the secure network services 76 (executed by the processor circuit 92 in the physical network device 88a) receiving the request by the user "P1" to register the physical network device 88a as an endpoint device "A" 12, including the external network address (e.g., "P1@AA.com") of the user "P1", the processor circuit 92 of the physical network device 88a executing the account management service in the secure network services 76 on the endpoint device "A" 12 can respond to the external network address entry (e.g., email address) by causing the secure network services 76 to generate a unique private key "prvKeyP1_A" and a public key "KeyP1_A" for the requesting party "P1" on the new endpoint device "A" 12. The account management service executed in the secure network services 76 by the processor circuit 92 on the endpoint device "A" 12 can generate and send a registration request (containing the secure public key "KeyP1_A") 106a to a prescribed destination 108 associated with the secure private core network 10 (e.g., a destination email address "registerme@whitestar.io" owned by the secure private core network 10) that is reachable outside the secure private core network 10 via the external data network 96 (e.g., the Internet, a 5G carrier, etc.). Hence, the device interface circuit 90 of the physical network device 88a can output, via the external data network 96, the registration request 106a received from the processor circuit 92 executing the NOS 56 for transmission, via the external data network 96, to a physical network device 88b hosting a messaging service (e.g., email server "@AA.com") for the subscriber "P1"; the messaging server 88b can forward the message 106a, via the external data network 96, to a physical network device 88c hosting a messaging service (e.g., email server "@whitestar.io") associated with the secure private core network 10 of the secure peer-to-peer data network 5.

The prescribed destination 108 of the registration request 106a can be hosted by the same physical network device 88c receiving the registration request 106a from the transmitting messaging server 88b or a different physical network device (e.g., 88d) in the secure private core network 10 (e.g., within a replicator device 16). The physical network device (e.g., 88c or 88d) hosting the prescribed destination 108 can cause its processor circuit 92 to execute a distributed search (DS) agent 82 in order to execute fraud control using the AI-based security service 64, including determining whether the external network address (e.g., email address "P1@AA.com") specified in the registration request 106a has been previously been used for any registration in the secure private core network 10, whether the external network address has been previously outcasted or "banned" by another subscriber or any AI-based security service 64 as owned by an untrusted party, etc.; the distributed search (DS) agent 82 (executed in the physical network device 88c or 88d) having received the registration request 106a can limit the scope in the availability of the external network address to prevent the MCP device 14 from obtaining any external network address (e.g., email address) "in the clear", for example based on limiting any validation of email addresses to only hashes of email addresses, described below.

In response to detecting that the external network address (e.g., email address) in the registration request is a new external network address and does not appear to be fraudulent, the distributed search (DS) agent 82 (executed in the physical network device 88c or 88d) that executed the fraud control can validate that the external network address can be trusted: in response, the distributed search (DS) agent 82 can cause the secure private core network 10 to generate and send a validation response (e.g., email message, text message, etc.) 114a to the external network address of the new subscriber "P1" (e.g., email "P1@AA.com" hosted by the physical network device 88b) via the external data network 96, where the validation message 114a can include the secure public key "KeyP1_A" generated by the secure network services 76 on the new device "A" 12: the secure public key "KeyP1_A" supplied in the registration request can be expressed in the validation message 114a in different forms, for example a QR code, a URL, or a text string.

Hence, the new subscriber "P1" can utilize the physical network device 88a (or another physical network device 88, as appropriate) to retrieve the validation response from the messaging server 88b "out of band" (i.e., outside the secure private core network 10): the validation response 114a specifies instructions enabling the new subscriber "P1" to submit the secure public key "KeyP1_A" for validation by the secure network services 76 executed on the new device "A" 12, for example in the form of a machine readable QR code, a URL link, or a machine-readable text string.

In response to the secure network services 76 executed on the new device "A" 12 (by the processor circuit 92 of the physical network device 88a) verifying the secure public key "KeyP1_A" in the validation response 114a, the secure network services 76 executed on the new device "A" 12 can register the physical network device 88a as the endpoint device "A" 12 based on auto-generating (crypto-generating) a federation ID "F1" 18 that is allocated to the email address "P1@AA.com" used by the subscriber "P1", thereby establishing a relationship between the email address "P1@AA.com" and the endpoint device "A" 12. The network operating system 56 executed in the endpoint device "A" 12 (within the physical network device 88a) executes registration also based on prompting the new subscriber "P1" to create a new password for entry into the secure data network 5, and by auto-generating (crypto-generating) an endpoint ID 20 for the endpoint device "A" 12 that is a 128 bit UUID (e.g., "EID_A"; "E1" in FIG. 2). The creation of a new password by the network operating system 56 ensures that the requesting party "P1" retains exclusive "ownership" (i.e., possession and control) of the endpoint device "A" 12, and thus establishes a two-way trusted relationship between the requesting party "P1" and the corresponding network device "A" based on the requesting party retaining possession and control of the network device.

If the physical network device 88*a* is to be shared with a second user (e.g., "P3"), then the network operating system 56 can establish a second "profile" for the second user "P3", enabling the second user "P3" to register via the identity management system as described herein for creation of a different federation ID (e.g., "F6") 18 and a different endpoint ID (e.g., "E6") 20 for the same physical network device; in this case, the endpoint object 22 specifying the endpoint ID (e.g., "E6") 20 for the physical device used by the second user "P3" can include a reference indicating the physical network device is shared separately by two federations (e.g., "F1" and "F6"); as apparent from the foregoing, there is no sharing between the two federations sharing the same physical network device unless a two-way trusted relationship is established between the two federations (e.g., "F1" and "F6") according to the prescribed secure salutation protocol.

Hence, the network operating system 56 executed in the endpoint device "A" 12 (by the processor circuit 92 of the physical network device 88*a*) can store in the memory circuit 94 of the endpoint device "A" 12 a federation object 32 that comprises the federation ID 18 and the endpoint object 22 having an endpoint ID "E1" 20 that uniquely identifies the endpoint device "A" 12 in the secure private core network 10. The federation object 32 stored in the endpoint device "A" 12 identifies the federation "F1" 34 within the secure private core network 10.

The network operating system 56 executed in the endpoint device "A" 12 also can generate a cryptographic nonreversible hash of the external network address (e.g., email address "P1@AA.com"), for example "HASH [P1@AA.com]", that is considered in the secure private core network 10 an acceptable identifier for the federation 34 that is also identified by the federation ID "F1". The nonreversible hash of the external network address guarantees anonymity of the user "P1" while maintaining absolute identity control; hence, an email address of an existing federation 34 can be protected against subsequent registration requests based on utilizing the nonreversible hash of the email address.

The network operating system 56 executed in the endpoint device "A" 12 can identify the MCP device 14 as a prescribed management agent in the secure peer-to-peer data network 5, establish a connection with the MCP device 14 (e.g., via an IP address that is made available to the network operating system executed in the endpoint device "A" 12), and generate and supply a registration message 126*a* comprising its cryptographic nonreversible hash (e.g., its hashed email address "HASH[P1@AA.com]"), its federation ID "F1" 18, and its endpoint ID "EID_A" that is owned by the federation ID "F1" (e.g., "HASH[P1@AA.com]→F1" and "F1→['EID_A']") (the network operating system 56 executed in the endpoint device "A" 12 also can include its public key "KeyP1_A"). The registration message also can include one or more network addresses (e.g., IP addresses) used by the endpoint device "A" 12 for communications via a data network 96 as a multi-hop transport layer (60 of FIG. 3) underlying the secure peer-to-peer data network 5. The registration message also can specify an "alias" used by the endpoint device "A" 12 as a reference for identifying a keypair (e.g., "KeypairP1_A"), where the network operating system 56 executed in the endpoint device "A" 12 can generate multiple private/public key pairs having respective aliases, for example different cohorts, different data flows, etc.

The processor circuit 92 of the physical network device 88*e* executing the MCP device 14 can respond to receiving the registration message 126*a* by causing its distributed search (DS) agent (82 of FIG. 1) to execute a projection search on the supplied identifiers "HASH[P1@AA.com]", "F1" 18 and/or "EID_A" 20 to determine if there are any matches. For example, the distributed search (DS) agent 82 can execute a projected search of the cryptographic nonreversible hash "HASH[P1@AA.com]" to determine if there is a match indicating the cryptographic nonreversible hash (generated using the same external network address) has already been used for an existing federation identifier 18 that is already registered in the secure peer-to-peer data network 5.

In response to the distributed search (DS) agent 82 finding no other matches, the MCP device 14 can register the new federation 34. Hence, the registration message 126*a* enables the MCP device 14, as the prescribed management agent for the secure data network 5, to associate the federation ID "F1" 18 as owning the cryptographic hash "HASH [P1@AA.com]" and the endpoint identifier "EID_A" 20; the registration message 126*a* further enables the MCP device 14 to associate the secure public key "KeyP1_A" with the endpoint identifier "EID_A" 20 owned by the federation ID "F1" 18. As described below, the registration message enables the MCP device 14 to generate and store a data structure, referred to as a "signet", that comprises the secure public key "KeyP1_A" of the endpoint device "A" 12, the "alias" used by the endpoint device "A" 12, a list of one or more network addresses (e.g., IP addresses) usable by the endpoint device "A" 12 for communications via an underlying data network 96 used as a multi-hop transport layer 60, and the endpoint ID "EID_A" 20 of the endpoint device "A" 12.

The MCP device 14, in response to determining there are no matches on the supplied identifiers "HASH [P1@AA.com]", "F1" 18 and/or "EID_A" 20 (indicating an absence of any previous use of the cryptographic nonreversible hash), can acknowledge the registration message based on generating and sending to the endpoint device "A" 12 a secure registration acknowledgment 136 indicating that there are no other endpoints, and can include a public key "Key_MCP" of the MCP device 14; the MCP device 14 can encrypt the public key "Key_MCP" with a temporal key (resulting in the encrypted data structure "ENC(Key_MCP)"), encrypt the temporal key with the secure public key "KeyP1_A" of the endpoint device "A" 12, and supply the encrypted temporal key "ENC(TK)" in the secure registration acknowledgment 136 with the encrypted data structure "ENC(Key_MCP)" to the endpoint device "A" 12. The supplied identifiers "HASH[P1@AA.com]", "F1" and "EID_A" also can be supplied by the MCP device 14 to the directory server 28 for subsequent projection searches in the secure private core network 10.

The network operating system 56 of the endpoint device "A" 12 can receive the secure registration acknowledgment 136 containing a first encrypted portion ("ENC(TK)") and a second encrypted portion "ENC(Key_MCP)". The supply of the encrypted temporal key "ENC(TK)" with the encrypted acknowledgment "ENC(Key_MCP)" in the secure registration acknowledgment 136 enables the network operating system 56 executed in the endpoint device "A" 12 to decrypt the temporal key "TK" using its private key "prvKeyP1_A", decrypt the acknowledgment using the decrypted temporal key "TK", and obtain the secure public key "Key_MCP" of the MCP device 14. Hence, the sharing of secure public keys between the endpoint device "A" 12 and the MCP device 14 establishes a two-way trusted relationship between the endpoint device "A" 12 and the MCP device 14 in the secure private core network.

Hence, at this stage the federation object 32 contains only the endpoint object 22 having an endpoint ID "E1" 20 that uniquely identifies the endpoint device "A" 12 used for initial registration with the secure private core network 10.

The same user "P1" can register a physical network device 88f as a new device "A1" 12 based on installing and instantiating the network operating system 56 on the physical network device 88f, and entering the same external network address (e.g., email address "P1@AA.com") of the subscriber "P1" in response to a prompt by the account management service executed in the secure network services 76 of the network operating system 56; the account management service executed in the secure network services 76 on the physical network device 88f can respond to reception of the external network address (e.g., email address "P1@AA.com") by causing the secure network services 76 to generate a unique private key "prvKeyP1_A1" and a public key "KeyP1_A1" for the user "P1" on the new device "A1" 12, and generate and send the registration request (containing the secure public key "KeyP1_A1") 106b to the prescribed destination (e.g., "registerme@whitestar.io") 108 associated with the secure peer-to-peer data network 5.

As described previously, receipt of the registration request 106b causes a physical network device (e.g., 88c or 88d) executing the distributed search (DS) agent 82 in the secure per-to-peer data network 5 to execute fraud control, for example based on determining an inordinate number of registration requests 106. The distributed search (DS) agent 82, having received the registration request, can limit the scope of searching the external network address (e.g., the email address) to prevent the MCP device 14 from obtaining the external network address "in the clear", and can generate and send a validation response 114b to the external network address (e.g., email address "P1@AA.com") of the subscriber "P1", where the validation response can include the secure public key "KeyP1_A1" generated by the secure network services 76 on the new device "A1" 12.

The subscriber "P1" can receive the validation response 114b that specifies instructions (e.g., QR code, URL, text string, etc.) for submitting the included secure public key "KeyP1_A1" for validation. In response to the secure network services 76 executed on the new device "A1" 12 verifying the secure public key "KeyP1_A1" in the validation response 114b, the secure network services 76 executed on the new device "A1" 12 can (temporarily) auto-generate a federation ID "FA1" 18 that is allocated to the external network address (e.g., email address "P1@AA.com") used by the subscriber "P1", establishing a secure relationship between the external network address (e.g., email address "P1@AA.com") and the endpoint device "A1" 12. The network operating system 56 executed in the endpoint device "A1" 12 also can respond to verifying the secure public key "KeyP1_A1" in the validation response 114b by prompting the subscriber "P1" to create a new password for entry into the secure data network 5 via the new device "A1" 12, and by auto-generating (crypto-generating) an endpoint ID 20 for the endpoint device "A1" 12 that is a 128 bit UUID (e.g., "E2" in FIG. 2).

Hence, the network operating system 56 executed in the endpoint device "A1" 12 can store in the memory circuit 94 of the endpoint device "A1" 12 the federation object 32 that comprises the endpoint object 22 specifying the federation ID "FA1" 18 and having an endpoint ID (e.g., "EID_A1") 20 that uniquely identifies the endpoint device "A1" 12 in the secure private core network 10. The federation object 32 stored in the endpoint device "A1" 12 identifies the federation ID "FA1" 18 within the secure private core network 10.

The network operating system 56 executed in the endpoint device "A1" 12 also can generate a cryptographic nonreversible hash of the external network address (e.g., the email address "P1@AA.com"), e.g., "HASH[P1@AA.com]", connect to the MCP device 14 (e.g., via an IP address that is made available to the network operating system executed in the endpoint device "A1" 12), and supply a registration message 126b.

The registration message 126b generated by the endpoint device "A1" 12 can specify the cryptographic nonreversible hash "HASH[P1@AA.com]", its federation ID "FA1" 18, and its endpoint ID "EID_A1" that is owned by the federation ID "FA1" (e.g., "HASH[P1@AA.com]→FA1" and "FA1→['EID_A1']") (the network operating system 56 executed in the endpoint device "A" 12 also can include its public key "KeyP1_A1"). The network operating system 56 executed in the endpoint device "A1" 12 also can add to the registration message 126b one or more network addresses used for communications via an underlying data network 96 used as a multi-hop transport layer (60 of FIG. 3).

The MCP device 14 can respond to reception of the registration message from the endpoint device "A1" 12 by causing its distributed search (DS) agent 82 to execute a projection search on the supplied identifiers "HASH[P1@AA.com]", "FA1" and/or "EID_A1".

In response to determining a match on the cryptographic nonreversible hash "HASH[P1@AA.com]", the distributed search (DS) agent 82 can cause the MCP device 14 to generate and output to the endpoint device "A1" 12 a secure endpoint acknowledgment 144 indicating another endpoint device "A" 12 exists in its federation 34; the acknowledgment generated also can include the signet of the endpoint device "A" 12 that is already a member of the same federation 34. The signet of the endpoint device "A" 12 can include: the secure public key "KeyP1_A" of the endpoint device "A" 12, an "alias" used by the endpoint device "A" 12, reachability information such as a list of one or more IP addresses usable by the endpoint device "A" 12, and the endpoint ID 20 of the endpoint device "A" 12.

As described previously, the MCP device 14 can encrypt the endpoint acknowledgment (containing the signet of the endpoint device "A" 12 and the secure public key "Key_MCP") with a temporal key, encrypt the temporal key with the secure public key "KeyP1_A1" of the endpoint device "A1" 12, and supply the encrypted temporal key in the secure endpoint acknowledgment 144 to the endpoint device "A1" 12. The supplied identifiers "HASH[P1@AA.com]", "F1" and "EID_A1" also can be supplied to the directory server 28 for subsequent projection searches in the secure private core network 10.

The encrypted temporal key in the secure endpoint acknowledgment 144 received by the endpoint device "A1" 12 enables the guardian security agent 66 in the network operating system 56 executed in the endpoint device "A1" 12 to decrypt the temporal key, decrypt the acknowledgment, and obtain the secure public key "Key_MCP" of the MCP device 14.

The guardian security agent 66 in the network operating system 56 executed in the endpoint device "A1" 12 can respond to the decrypted acknowledgment (specifying another endpoint is a member of the same federation 34, and that contains the signet for the endpoint device "A" 12) by initiating a prescribed secure salutation protocol with the endpoint device "A" 12. In particular, the secure network service 76 executed in the endpoint device "A1" 12 can generate and send, based on the received signet, a secure salutation request 148 identifying its endpoint ID "EID_A1" 20 and requesting a relationship with the endpoint device "A" 12; the salutation request can be encrypted using the secure public key "KeyP1_A" of the endpoint device "A" 12, and can include the alias (associated with the secure public key "KeyP1_A"), and also can include the secure public key "KeyP1_A1" of the endpoint device "A1" 12.

The endpoint device "A" 12 can "automatically" respond back with the endpoint device "A1" 12, for example the network operating system 56 executed in the endpoint device "A1" 12 can infer that the endpoint device "A" 12 and the endpoint device "A1" 12 are in the same federation based on a determined match of the hashed external network addresses (e.g., email addresses: for example, a search by a distributed search (DS) agent 82 on a hash of the email address can return the endpoint IDs for both the endpoint device "A" 12 and the endpoint device "A1" 12.

Hence, the network operating system 56 executed in the endpoint device "A" 12 can respond to the salutation request by sending a secure salutation reply (e.g., a salutation acceptance) 150 that includes the endpoint object 22 of the endpoint device "A" 12: the salutation reply 150 can be encrypted as described above using a temporal key that is further encrypted using the secure public key "KeyP1_A1", for formation of a secure salutation reply (e.g., secure salutation acceptance).

Hence, the network operating system 56 executed in the endpoint device "A1" 12 can determine from the endpoint object 22 of the endpoint device "A" 12 specified in the secure salutation reply 150 received that the endpoint object 22 specifies a federation ID "F1" 18: the federation ID "F1" 18 in the endpoint object 22 in the salutation acceptance 150 causes the network operating system 56 in the endpoint device "A1" 12 to determine that the endpoint device "A" 12 pre-existed in the secure private core network 10; hence, the network operating system 56 in the endpoint device "A1" 12 can establish a two-way trusted relationship with the endpoint device "A" 12 based on exchange of the public keys "KeyP1_A" and "KeyP1_A1", and in response re-associate its federation ID from "FA1" to "F1" in its endpoint object 20, and discard the initial federation ID "FA1". Consequently, the network operating system 56 in the endpoint device "A1" 12 adopts the federation ID "F1" 18, thus establishing the identity of the owner of the devices "A" and "A1" as federation"F1" 34. Hence, the endpoint device "A1" 12 in its corresponding endpoint object 22 adopts the identity, user name, user image, etc. of the same user as in the endpoint device "A" 12 (as identified by its corresponding endpoint ID 20).

Hence, the secure private core network 10 can establish that the federation "F1" 32 owns the endpoint devices "A" and "A1" 12; moreover, a cohort is established between the endpoint devices "A" and "A1" 12 based on sharing cryptographic keys, such that any content created on one endpoint (e.g., endpoint device "A" 12) can be autonomically and securely replicated to the other endpoint (e.g., endpoint device "A1" 12) by the autonomic synchronizer 52. Since the synchronization process in the secure private core network 10 is aware of all the federations 34, any connection by an existing endpoint device 12 in a federation 34 to a new endpoint device 12 or a new federation 34 can cause autonomic replication of the connection to the other devices in the existing federation 34 or the new federation 34 by the associated autonomic synchronizer 52.

According to example embodiments, an identity management system ensures establishment of two-way trusted relationships in a secure peer-to-peer data network based on ensuring each identity is verifiable and secure, including each federation identity that creates a verified association with an identified external network address used by a requesting party, and each endpoint identifier that is cryptographically generated and associated with a federation identity, enabling a federation identity to own numerous endpoint identifiers for aggregation of two-way trusted relationships in the secure peer-to-peer data network.

Distributed Crypto-Signed Switching in a Secure Peer-to-Peer Network

The secure storage and transmission of data structures can be extended between different "federations" of network devices, including endpoint devices (established by different users having established respective two-way trusted relationships with the secure peer-to-peer data network), and replicator devices, according to the prescribed secure salutation protocol under the control of the AI based security suite 64. Hence, crypto-signed switching can be enabled between two-way trusted network devices in a secure peer-to-peer data network, according to the prescribed secure salutation protocol under the control of the AI based security suite. Additional security-based operations can be deployed in a scalable manner in the secure peer-to-peer data network, based on the distributed execution of the AI-based security suite 64.

The guardian security agent 66 can secure (i.e., encrypt) all "at-rest" data structures as first secure data structures for secure storage in the network device, for example based on encrypting each "at-rest" data structure with a corresponding private key: for example, the guardian security agent 66 executed in the endpoint device "A" 12 can secure the "at-rest" data structures using the private key "prvKeyP1_A" that can be dynamically generated by the guardian security agent 66 during initialization of the network operating system 56. The guardian security agent 66 (executed, for example, by the endpoint device "A" 12) also can secure "in-flight" data structures as second secure data structures based on dynamically generating a temporal key "TK", and encrypting the temporal key 68 with a public key (e.g., "Key_B") of a destination device (e.g., the endpoint (device "B" 12, ensuring secure communications in the secure peer-to-peer data network 5. Additional details regarding encrypting "at rest" data structures and "in-flight" data structures are described below, and are also disclosed in the above-incorporated U.S. Publication No. 2021/0028940.

In particular, the guardian security agent 66 of a source network device (e.g., an endpoint device "A" 12) can encrypt an "in-flight" data packet into a secure data packet based on dynamically generating a unique temporal key (e.g., "TK") used for encrypting a data packet payload into an encrypted payload, and encrypting the unique temporal key into an encrypted temporal key (e.g., "ENC(Key_B)[TK]") using a secure public key (e.g., "Key_B") of a destination device (e.g., endpoint device "B" 12) identified within a destination address field (e.g., "DEST=B"). In other words, the guardian security agent 66 of the source endpoint device dynamically generates a new temporal (e.g., time-based) key "TK" for each secure data packet to be transmitted, ensuring no temporal key is ever reused; moreover, the encrypted temporal key ensures that only the destination device can decrypt the encrypted temporal key to recover the temporal key used to encrypt the payload.

The guardian security agent 66 of a source network device (e.g., an endpoint device "A" 12) also can digitally sign the packet (containing the encrypted payload and encrypted temporal key) using the endpoint device A's private key "prvKeyP1_A" to generate a source endpoint signature. Hence, the guardian security agent 66 can generate the secure data packet for secure "in-flight" communications in the secure peer-to-peer data network 5.

Figure 6:
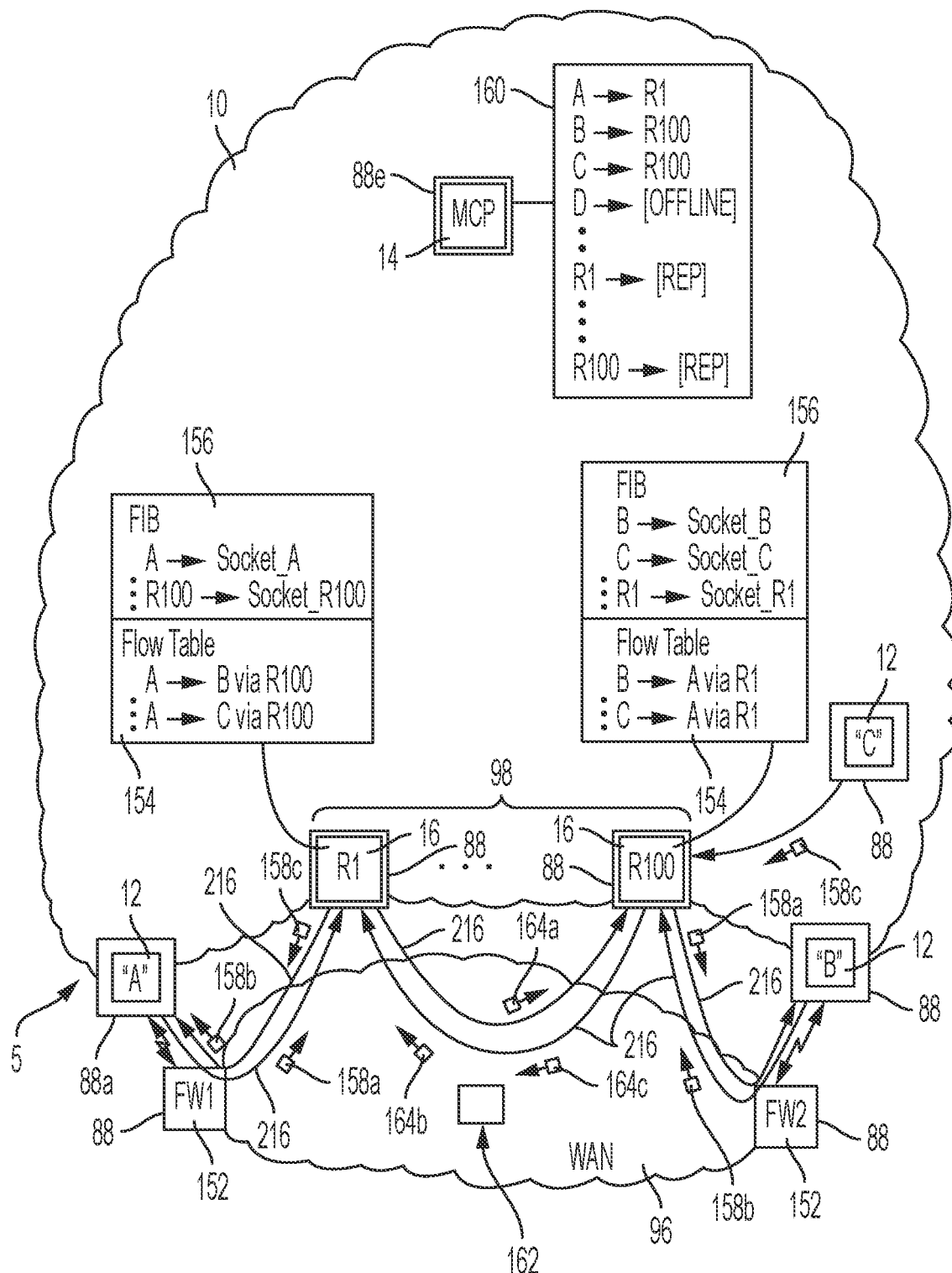
FIG. 6 illustrates crypto-signed switching between two-way trusted network devices in a secure peer-to-peer data network, according to an example embodiment.

The source endpoint signature generated by the guardian security agent 66 in the source network device (e.g., the endpoint device "A" 12) enables the guardian security agent 66 of a receiving network device (e.g., the replicator device "R1" 16, and/or the endpoint device "B" 12 of FIG. 6) in possession of the public key "KeyP1_A" to validate that the secure data packet is from the endpoint device "A" 12. The guardian security agent 66 of the receiving network device also can validate an incoming secure data packet based on determining that the receiving network device (e.g., the replicator device "R1" 16, and/or the endpoint device "B" 12 of FIG. 6) has a two-way trusted relationship with the source network device as described above, where the source network device can be identified by the source address field "SRC=A".

Hence, the guardian security agent 66 of a receiving network device (e.g., the replicator device "R1" 16 or the endpoint device "B" 12 in FIG. 6) can validate an identity for a received secure data packet 158, based on validating a source endpoint signature using the corresponding public key (e.g., "KeyP1_A") of the source network device (e.g., the endpoint device "A" 12), and based on the guardian security agent 66 of the receiving network device determining that it has a two-way trusted relationship with the source network device identified in the source address field.

The guardian security agent 66 of each of the replicator devices "R1" and "R100" 16 also can enforce crypto-signed switching based on validation of a replicator signature. In particular, following validation of the secure data packet 158, the guardian security agent 66 of the replicator device (e.g., "R1") 16 can cryptographically sign the secure data packet, using its private key "prvKey_R1" to generate a replicator signature for secure transmission to its trusted peer replicator device "R100" 16 as a secure forwarded packet (e.g., 164a) containing the secure data packet (e.g., 158a) and the replicator signature, ensuring no network node 162 in the underlying external data network 96 can decrypt the secure data packet (e.g., 158a) contained in the secure forwarded packet (e.g., 164a).

Similarly, the guardian security agent 66 of a replicator device (e.g., "R100") 16 can determine that the cryptographically-signed secure forwarded packet (e.g., 164a of FIG. 6) is received from a trusted peer replicator device (e.g., "R1") 16, and can execute validation of the secure forwarded packet (e.g., 164a) based on verifying the replicator signature in the secure forwarded packet using the public key "Key_R1" of the replicator device "R1" 16. As described below, the guardian security agent 66 and/or the sentinel security agent 68 of the replicator device (e.g., "R100") can verify the secure forwarded packet is not a replay attack. The replicator device (e.g., "R100") can respond to successful validation of the secure forwarded packet (containing the secure data packet 158a) by forwarding the secure data packet (e.g., 158a) to its attached destination endpoint device (e.g., "B") 12, maintaining the cryptographic security of the secure data packet (e.g., 158a) for decryption by the attached destination endpoint device "B" 12 following validation of the secure data packet (e.g., 158a) by the guardian security agent 66 in the destination endpoint device "B" 12.

Hence, the guardian security agent 66 can validate identities for establishment and enforcement of all two-way trusted relationships, including during execution of the prescribed secure salutation protocol as described previously.

The secure network services 76 executed in each physical network device 88 also includes a sentinel service 68. The sentinel service 68 is implemented in each physical network device 88 as executable code (e.g., an executable "agent") within the secure network services 76; hence, the sentinel service 68 also can be referred to herein as a sentinel agent 68.

The navigator security agent 70 of an endpoint device (e.g., the endpoint device "A" 12) can enable secure communications to be established through a firewall (e.g., "FW1" 152 of FIG. 6) of a locally-utilized wireless data network, based on establishing a two-way trusted relationship with a replicator device (e.g., "R1" 16) in the secure peer-to-peer data network 5, for example according to the prescribed secure salutation protocol. As illustrated in FIG. 6, the "mesh" 98 of interconnected replicator devices 16 enables the replicator device "R1" 16 to provide reachability to the destination network device "B" via a second replicator device "R100" 16.

In particular, the crypto-signed switching described herein is based on the MCP device 14, as the prescribed management agent in the secure peer-to-peer data network 5, tracking a connection status 160 of every network device in the secure peer-to-peer data network 5, including each endpoint device 12 and each replicator device 16. The MCP device 14 establishes a pairwise topology (e.g., a mesh) 98 of two-way trusted replicator devices 16 based on causing the guardian security agent 66 of each replicator device 16, during registration with the MCP device 16, to execute a prescribed secure salutation protocol with each and every other replicator device 16 in the secure private core network 10. The MCP device 14 also causes the guardian security agent 66 of each endpoint device 12, during registration with the MCP device 16 (or in response to the endpoint device 12 returning from an "offline state" to an "online" state), to establish a two-way trusted relationship with an identified replicator device (selected by the MCP device 16) based on executing a prescribed secure salutation protocol with the identified replicator device 16; hence, the navigator security agent 70 executed in the endpoint device "A" 12 can create an entry specifying that a replicator device is reachable via an identified wireless data link between the endpoint device "A" 12 and the firewall device "FW1" 152.

The MCP device 14 also can identify, for a requesting replicator device (e.g., "R1") 16, a peer trusted replicator device (e.g., "R100") 16 for reaching a destination endpoint device (e.g., "B"), even if the secure peer-to-peer data network 5 utilizes the external data network 96 where each endpoint device 12 can be physically located in a wireless local area network that is secured by a security appliance (e.g., a firewall device) 152, and replicator devices 16 forward secure forwarded packets 164 via the external data network 96.

The example embodiments also are particularly effective in cases where actual deployment is via an existing IP network infrastructure 96, for example where the endpoint device "A" is connected within a first private (e.g., "home 1") IP network secured by a first firewall device "FW1" 152, and the second endpoint device "B" is connected within a second private (e.g., "home 2") IP network secured by a second firewall device "FW2" 152. The navigator security agents 70 of the endpoint devices "A" and "B" can dynamically establish a secure virtualized peer-to-peer connection, using crypto-switching via the pairwise topology 98 in the secure private core network 10, in a manner that maintains security and trust and while maintaining secrecy of the data traffic as it traverses through the secure private core network 10 via the underlying external data network 96; in other words, the crypto-switching via the pairwise topology 98 ensures that no core component (e.g., replicator device 16 or the MCP device 14) is capable of detecting the contents of any payload transmitted by endpoint devices "A" or "B".

The replicator devices "R1" and "R100 16 can create a flow table entry 154 that maintains a flow state for reaching a destination endpoint device via an identified trusted peer replicator device 16; each replicator device 16 also can establish a forwarding information base (FIB) entry 156 that enables the replicator device 16 to reach each trusted peer replicator device 16 and each connected endpoint device 12**.

Hence, the navigator security agent 70 enables secure communications to reach endpoint devices 12 located "behind" a security appliance 152, since the endpoint device (e.g., "A") 12 can execute the prescribed secure salutation protocol with the identified replicator device 16, causing the associated secure appliance (e.g., "FW1") 152 to create a state entry that identifies the replicator device (e.g., "R1") 16, for example based on the IP address of the replicator device (e.g., "R1") 16 that is specified in the destination address field of a secure data packet (e.g., 158a of FIGS. 7 and 8). The state entry created by the security appliance 152 also can be updated in response to the endpoint device "A" 12 sending a secure data packet (e.g., 158a) to its replicator device (e.g., "R1") 16; hence, the state entry created by the secure appliance (e.g., "FW1") 152 enables the replicator device (e.g., "R1") 16 to send a second secure data packet (e.g., 158b) back to the endpoint device (e.g., "A") 12 via the secure appliance (e.g., "FW1") 152.

The sentinel security agent 68 can detect a replay attack based on executing a prescribed hash on each encrypted temporal key within a received secure data packet 158. In particular, the encrypted temporal key not only ensures that the destination device is the only network device in the secure peer-to-peer data network 5 that can decrypt the encrypted payload: the encrypted temporal key also provides for the secure data packet a cryptographically-unique encrypted bitstring, also referred to herein as a "nonce" (or "nounce"), that enables any physical network device 88 receiving the secure data packet 158 to verify the secure data packet 158 is not a copy of a prior transmitted data packet (indicating a replay attack).

Hence, the sentinel security agent 68 of an endpoint device 12 can respond to receiving a secure data packet 158 (or the sentinel security agent 68 of a replicator device 16 can respond to receiving a secure forwarded data packet 164) by retrieving an encrypted bitstring from the "encrypted temporal key field", and executing its own prescribed hash (e.g., using its own unique hash parameters) to generate a hashed value of at least a portion of the encrypted bitstring (corresponding to the encrypted temporal key). The sentinel security agent 68 can compare the hashed value with other stored hash values (e.g., previously stored in a data structure within its memory circuit 94) to determine whether the hashed value equals a prior instance of a hashed value for a prescribed time interval (e.g., one minute).

It is mathematically impossible for hashes of different encrypted temporal keys to have an identical hash value unless the data packet 158 (or 164) is copied: hence, the sentinel security agent 68 executed by the processor circuit 92 of any physical network device 88 can determine that the secure data packet 158 (or 164) is not a copy based on a determined absence of a prior instance of the prescribed hash, and can continue processing the secure data packet 158, including storing the prescribed hash for future comparisons for subsequently-received secure data packets 158 or 164, for example for a corresponding identified source-destination flow.

Conversely, any sentinel security agent 68 can detect a replay attack in response to determining the prescribed hash from the received secure data packet 158 matches a prior instance of the prescribed hash on a previously-received secure data packet 158, indicating the secure data packet is a copy of a previously-received data packet.

Localized Machine Learning of User Behaviors in Network Operating System for Enhanced Secure Services FIG. 7 illustrates in further detail the secure network services layer 76 of the network operating system 56 of FIG. 3, including localized secure machine learning of user behaviors for enhanced secure services in the secure peer-to-peer data network 5 based on a secure user database 168 in the network operating system that is exclusively owned and controlled by the user, according to an example embodiment.

As described previously, the network operating system 56 implements all executable services associated with security in the secure data network 5, including encryption of in-flight and at-rest data structures, identity protection, enforcing privatization of user metadata, secure outcasting of bad actors, intrusion prevention, etc. The network operating system 5 retains exclusive control to any access of the secure data network 5, or to any access of any in-flight and at-rest data structures associated with a user interacting with the secure data network 5. Hence, all applications and all users can interact in the secure data network 5 with trust and knowledge that all network-based services, user identities, user data, user metadata, etc., are secured in the secure data network 5.

Hence, FIG. 7 illustrates that the secure network services 76 executed by the network operating system 56 can include a private user-assist suite 172 comprising one or more executable agents, for example the autonomic synchronizer agent 52, an executable projection search agent 82, a voice agent 102, an autocorrector agent 104, a conversation agent 166, a distributed lazy loader agent 206, and a connection agent 252, also referred to as a "social connection agent". The secure network services 76 also includes the AI-based security agents 64, and a lifecycle manager 248 that enforces the lifecycle policies 24 of the data objects.

As described below, the private user-assist suite 172 enables localized secure machine learning of user behaviors, for enhanced secure services in the secure peer-to-peer data network in a manner that ensures all associated user metadata is secured for exclusive ownership and control by the user. In particular, the private user-assist suite 172 can utilize AI-based learning machines that can build prediction models, enabling improved and enhanced network-based service operations, while preserving secrecy of the user identity while accessing various destinations via the secure data network 5. Hence, a user's knowledge base can be autonomically increased via the secure data network 5, without any unwilling disclosure of the user identity or identities of other users in the secure data network 5.

The private user-assist suite 172 can comprise the autonomic synchronizer agent 52, the projection search engine 82, the agents 102, 104, 166, 206, 252, and other agents not shown. The private user-assist suite 172 can ensure that all localized machine learning of user behaviors is secured for exclusive ownership and control by the corresponding federation user (e.g., "F1"). The private user-assist suite 172 also can ensure that a user identity is not disclosed in any projection search beyond a two-way trusted replicator device (e.g., "R1") 16 in the secure data network 5. Hence, in contrast to existing Internet technology where a user action in the Internet exposes the user's identity to various service providers and/or search services via an external data network 96 such as the Internet, the private user-assist suite 172 can ensure that no service provider or search service in the secure peer-to-peer data network 5 can identify a federation user, without: (1) establishment of a two-way trusted relationship with a user endpoint device (e.g., "A") 12, and (2) explicit authorization from the federation user (e.g., "F1").

FIGS. 8A-8E illustrate the localized secure machine learning of user behaviors in the network operating system of FIG. 3, for enhanced secure services in the secure peer-to-peer data network, according to an example embodiment.

As described previously, the secure data network 5 is based on the establishment and aggregation of two-way trusted relationships between network devices, including between federations 34 of endpoint devices 12, an MCP device 14, replicator devices 16, and other physical network devices 88 that can execute various network operations, including for example a directory server 28, a community server 30, etc.

Figure 8A:
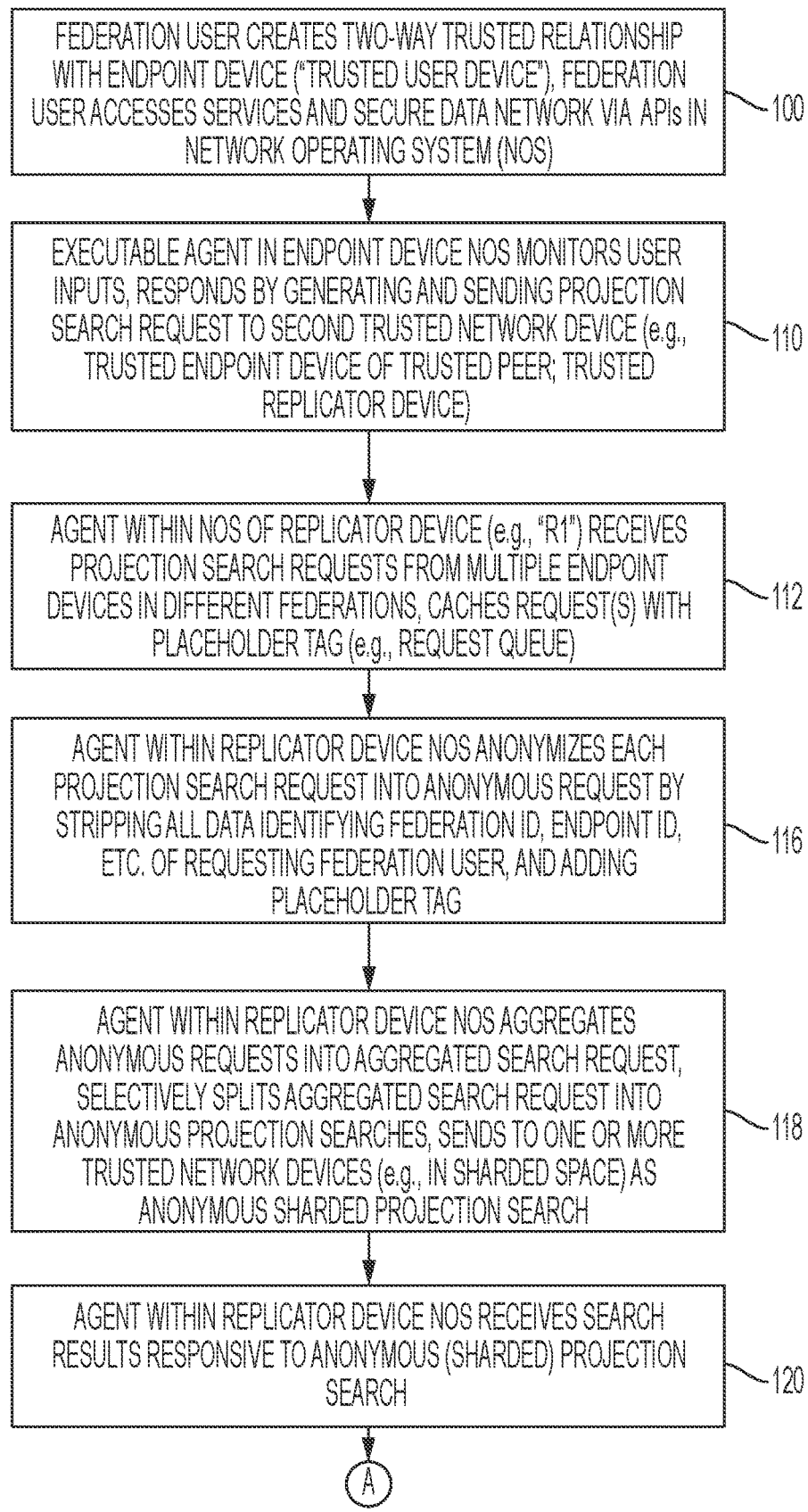
FIGS. 8A-8E illustrate the localized secure machine learning of user behaviors in the network operating system of FIG. 3, for enhanced secure services in the secure peer-to-peer data network based on illustrates an example implementation of a tag object as a stored data structure in the secure peer-to-peer data network, according to an example embodiment.

As described previously, the MCP device 14 operates as a prescribed management agent in the secure peer-to-peer data network 5, and also enables a federation user to create in operation 100 of FIG. 8A a two-way trusted relationship with an endpoint device (e.g., "A", "A1") 12, upon connection to the secure data network 5, to establish a federation 34 of trusted endpoint devices (e.g., "A", "A1") 12. The MCP device 14 also enables a federation user to create in operation 100 a two-way trusted relationship between an endpoint device (e.g., "A") 12 and a replicator device (e.g., "R1") 16.

Further, the network operating system 56 executed in each physical network device 88 operates as a secure executable container that ensures that the secure data network 5 or any secure data structure associated with the secure data network 5 or any network device (e.g., 12, 14, 16) cannot be accessed except via a prescribed access by an API 80.

Hence, the network operating system 56 executed within an endpoint device 12 and/or a replicator device 16 can provide within its secure network services layer 76 a plurality of executable agents that can execute a localized secure machine learning of user behaviors by the user (e.g., "F1") of any two-way trusted endpoint device (e.g., "A", "A1") in the user's federation 34: the localized secure machine learning enables generation and secure storage of a secure user database 168, within the memory circuit 94 under the exclusive control of the network operating system 56.

As described previously, a distributed search (DS) agent 82 also can obtain metadata from other trusted agents executed in the secure private core network 10 to extract feature graphs for assistance in AI-based decisions such as recommendations whether to accept connection requests or conversation requests, keyboard word suggestions, etc. The distributed search agent 82 (also referred to as the projection search agent or projection search engine) is distributed in network devices (e.g., replicators, endpoint devices) throughout the secure data network 5. The distributed search agent 82 can execute sharded searches across the secure data network 5, described below. The projection search agent 82 can process projection searches: projection searches can include scope (local, global, etc.), types, projection entries, exclusions, times (e.g., one-time, deadline).

Projection entries can have projection fields and projection types that can be searched and matched by the projection search agent 82. Example searchable projection fields can include: email, signet, endpoint ID, federation ID, URL, JPEG image, GIF image, PNG image, trending images, online status of endpoint device, whether an object is subscribed, order identification, next hop ID, when last connected, conversation summary, conversation type, conversation, community, hash tag, star tag, message ID, post summary ID, conversation title, post reply reference, etc. Hence, any kind of projection search can be built and injected into the network as a distributed projection search request using any one or more of the searchable projection fields.

Hence, the projection search agent 82 enables isolated anonymous projection searches that can provide "pinpoint" or "isolated" search operations in the secure data network, without exposure of any user identity. The projection search agent 82 can be used by the application layer 58 (via an API 80), and by agents in the network operating system 56, for example by agents executing assistive operations such as attracting requested information (e.g., dot-tagged information, star-tagged information, and/or hash-tagged information) into a conversation, etc. Hence, each agent accessing the projection search agent 82 can generate its own ad-hoc tag, as needed, for tracking a corresponding projection search.

Referring to FIG. 8A, an executable agent in the endpoint device (e.g., the voice agent 102, the autocorrector agent 104, the conversation agent 166, etc.) 12 in operation 110 can monitor typed and/or spoken user inputs for a search event, and in response cause the distributed search (DS) agent 82 to generate and send a projection search request to a second two-way trusted network device, for example a two-way trusted peer endpoint device (e.g., "B") 12 if disconnected from the secure data network 5, or its two-way trusted replicator device (e.g., "R1"). Alternately an executable application at the application layer 58 can initiate a search request via a prescribed API 80. Each search request generated in response to a search event can include a dynamically-generated tag (e.g., an application-defined tag) that can be sent with the projection search request.

The distributed search (DS) agent 82 executed in the replicator device "R1" 16 in operation 112 can receive one or more projection search requests from one or more endpoint devices 12 that have connected to the replicator device "R1" 16 based on having established a two-way trusted relationship with the replicator device. The distributed search (DS) agent 82 executed in the replicator device "R1" 16 can receive numerous projection search requests from different federation entities (e.g., "F1", "F4" through "F1000", etc.), hence the distributed search (DS) agent 82 in operation 112 can cache each of the projection search requests with its own corresponding dynamically-generated placeholder tag into a request queue, for example as a secure "at-rest" data structure in the memory circuit (e.g., RAM) 94 of the replicator device "R1" 16.

The distributed search (DS) agent 82 executed in the replicator device "R1" 16 in operation 116 can ensure no user identity or user metadata is exposed within the secure core network 10, or the external data network 96, based on "anonymizing" each of the received projection search requests into respective anonymous search requests to hide identities of requesting endpoint devices. In particular, the distributed search (DS) agent 82 executed in the replicator device "R1" 16 in operation 116 can generate an anonymous search request based on stripping any and all data that can identify a federation user or any corresponding endpoint device 12 from each received projection search request, and adding the corresponding placeholder tag that maps the anonymous search request to the received projection search request. The placeholder tag, which is opaque to the one or more network devices 88 executing the directory server 28 in the sharded information space, can be used as a "routing" tag during projection search operations that causes one or more directory servers 28 to return the placeholder tag with any search result. Hence, the placeholder tag provided with a search result enables a replicator device 16 to associate a search result with an anonymous sharded projection search, for distribution of the search result to the requesting endpoint devices.

The distributed search (DS) agent 82 executed in the replicator device "R1" 16 in operation 118 can further "anonymize" a search request by aggregating the anonymous search requests (containing their respective placeholder tags) into an aggregated search request. The distributed search (DS) agent 82 executed in the replicator device "R1" 16 in operation 118 also can selectively split the aggregated search request into multiple anonymous projection searches. The distributed search (DS) agent 82 in the replicator device "R1" 16 in operation 118 can send the anonymous projection searches, for example as an anonymous sharded projection search, to one or more two-way trusted network devices 88 in the secure core network 10 that execute the directory server 28 as part of a sharded information space. For example, different users can be searching for trending animated GIFs for a certain topic: the network device (e.g., a replicator device) can anonymize and join the search requests for trending animated GIFs, and search requests for other information types, into a combined anonymous search, forward the combined search request as an anonymous sharded projection search to the sharded information space (hosted by one or more directory servers having a pairwise trust relationship with the requesting replicator device).

Any projection search results generated by a network device 88 executing at least a part of the directory server 28 in a distributed architecture in the sharded information space can be returned to the replicator device 16. In particular, any one or more of the directory servers 28 can use a hierarchy of least recently used (LRU) caches for cached storage of prior search results, where a cached search result can be "pushed" from an existing LRU cache at capacity to a lower LRU cache as the cached search result "ages" relative to other cached search results. The hierarchy of LRU caches also can be sharded into concurrency "envelopes" for implementation of "shard locks" that can be implemented in parallel across multiple processor cores.

If any projection search result has been cached by the one or more directory servers 28, the cached projection search result can be returned by the one or more directory servers to the requesting replicator device.

If any projection search result has not been cached, the LRU cache devices comprise executable code ("search computers") that can calculate the search results and cache the search results (generically for any anonymous requester); hence, the cached search results can be retrieved and supplied for any anonymous requester. In particular, the search computers can use a concurrent LRU cache executable resource: if an element is not found in an LRU cache, an executable "Compute if Absent" function can be called and passed a key, and it returns a value that is stored in the LRU cache; hence, the "Compute if Absent" function can perform the relatively expensive calculation and return a result for storage in a concurrent LRU cache. In one example, the "Compute if Absent" function can perform its own search or its own calculation, as needed; the "Compute if Absent" function also can fetch an "at-rest" encrypted data structure stored on a flash file system, decrypt and store the decrypted data structure in a primary RAM location that is accessible only within the network operating system; in another example, the "Compute if Absent" function can serialize an element, for example if an information request specified returning the results as a byte array.

Hence, the replicator device 16 can minimize the number of search operations to a single search operation that can generate a single search result responsive to the multiple projection search requests. The anonymous sharded projection search prevents any exposure of an endpoint device to a directory server in the sharded information space. Moreover, each communication between two network devices is based on the pairwise trust relationship (i.e., two-way trusted relationship) between the two network devices.

The distributed search (DS) agent 82 executed in the replicator device (e.g., "R1") 16 in operation 120 can receive and cache the search results that contain the placeholder tags that are responsive to the anonymous (sharded) projection search. In particular, the placeholder tag provided with the search result enables the distributed search (DS) agent 82 in the replicator device "R1" 16 to associate the search result with the anonymous sharded projection search, for distribution of the search result to the requesting endpoint devices having pending search requests in the request queue.

Figure 8B:
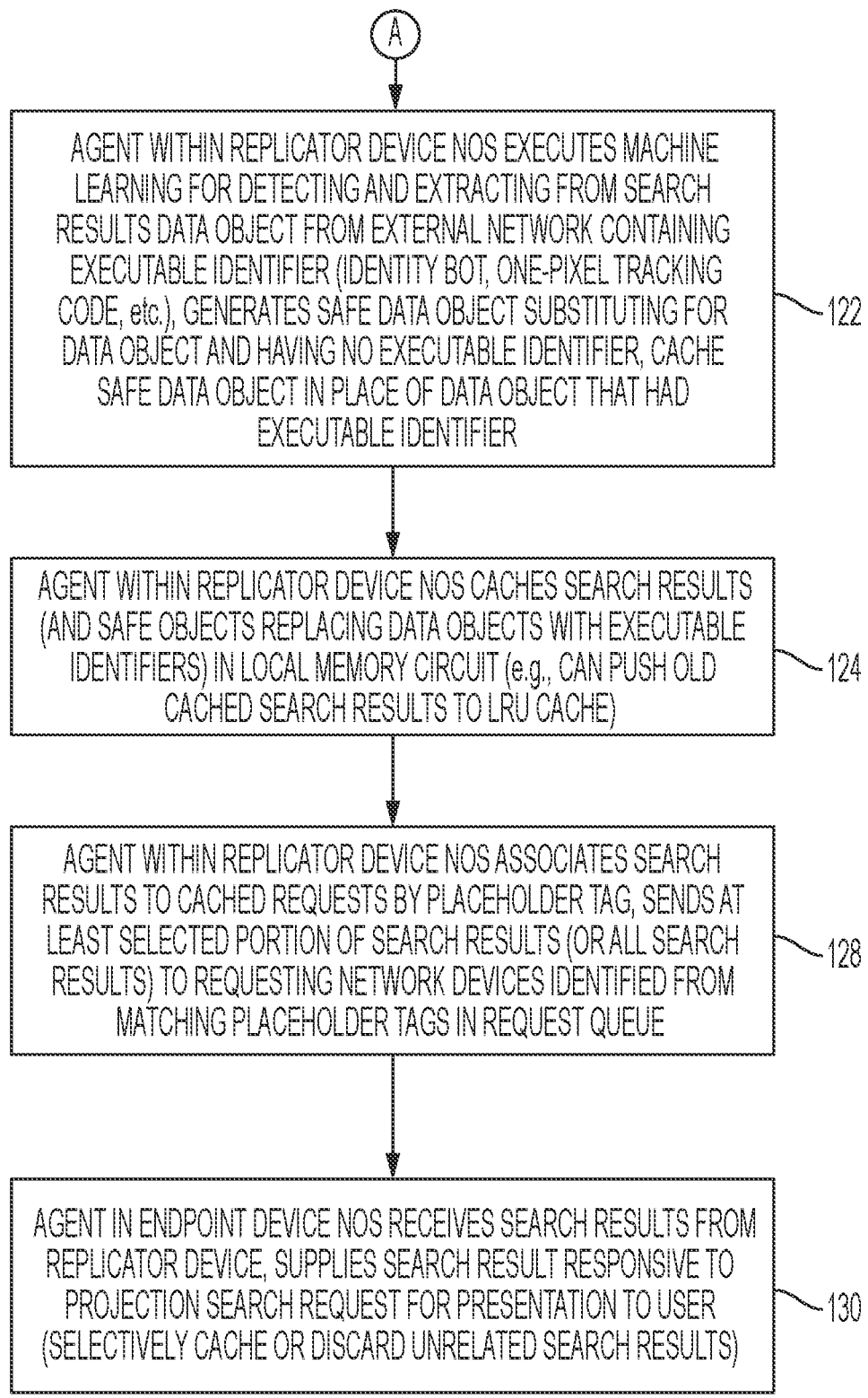

Referring to FIG. 8B, the distributed search (DS) agent 82 executed in the replicator device "R1" 16 in operation 122 can respond to the search results by executing machine learning for detection and extraction of any data object that contains an executable identifier that can identify a user and/or user network device that renders the data object. For example, an agent (e.g., the distributed search (DS) agent 82 or another agent) in the replicator device "R1" 16 can determine if an external data object, for example an animated GIF object retrieved from an external data network 96 (e.g., a website on the Internet) as part of the projection search, includes any executable identifier code that attempts to identify a user of the data object (e.g., an "identity bot" or a one-pixel "tracking code"). In response to the detection of the identifier code, the agent (e.g., the distributed search (DS) agent 82) in operation 122 executed in the replicator device "R1" 16 can autonomically execute an improved delivery of a search result based on generating a "safe" data object (e.g., a safe animated GIF object) based on executing a "scrub" of the identifier code from the external data object, where the "safe" data object can serve as an adequate substitute for the data object and is unable to identify any user information during rendering of the "safe" data object. The distributed search (DS) agent 82 in the replicator device "R1" 16 in operation 122 can cache the "safe" data object for unlimited distribution to any requesting endpoint device 12 in the secure data network 5 if necessary, the distributed search (DS) agent 82 in the replicator device "R1" 16 in operation 122 also can replace in a search result any reference (e.g., URI) referencing an external destination 162 in the external data network 96 with a replacement reference that references the "safe" data object cached in the replicator device "R1" 16.

Hence, the distributed search (DS) agent 82 in the replicator device "R1" 16 in operation 124 can cache all search results (and all "safe" data objects replacing data objects having executable identifiers) in a local memory circuit 94 under the exclusive control of the network operating system 56. As described previously, the replicator device "R1" 16 can include one or more LRU caches, enabling "pushing" older cached search results to the LRU cache.

The distributed search (DS) agent 82 in the replicator device "R1" 16 in operation 128 can associate the search results with the cached requests based on the respective placeholder tags, and send in operation 128 at least the selected portion of the search results to the requesting endpoint devices 12 identified from the matching placeholder tags in the request queue. If desired, the distributed search (DS) agent 82 in the replicator device "R1" 16 in operation 128 can also provide all the search results to each requesting endpoint device 12, enabling the distributed search (DS) agent 82 in each requesting endpoint device 12 in operation 130 to selectively supply (based on capacity) the search results responsive to the projection request for presentation to the user (or the requesting application); depending on capacity, the distributed search (DS) agent 82 also can cache the search results received from the replicator device "R1" 16.

Hence, the network operating system 56 executed in the replicator device "R1" 16 ensures that the federation user "F1" can enjoy search results, without any disclosure of any identity information about the federation user "F1" or the user's endpoint device "A" 12, based on the network operating system 56 in the replicator device "R1" 16 executing a secure machine learning operation detecting identity information of the federation user "F1" and/or the user endpoint device "A" in the search request, and anonymizing the search request prior to executing an anonymous sharded projection search (for multiple user endpoint devices) into the core data network 10. The replicator device "R1" 16 also can improve operations for the network-based search service based on caching any received search results and/or any retrieved data objects, minimizing the need for retrieval of data objects from an external data network 96. The replicator device "R1" 16 also can improve operations for the network-based search service based on "sanitizing" any data object received from the external data network 96, for example based on generating and caching a safe data object that substitutes for the data object containing an executable identifier configured for identifying a user and/or user device the data object.

As illustrated in FIG. 7, the secure network services 76 of the network operating system 56 comprises an executable autocorrector agent (or "autocorrector") 104. The autocorrector 104 (and other executable agents in the secure network services 76) is configured for building a secure user database 168 comprising a user vocabulary 134, and a predictive user word model 138.

Figure 8C:
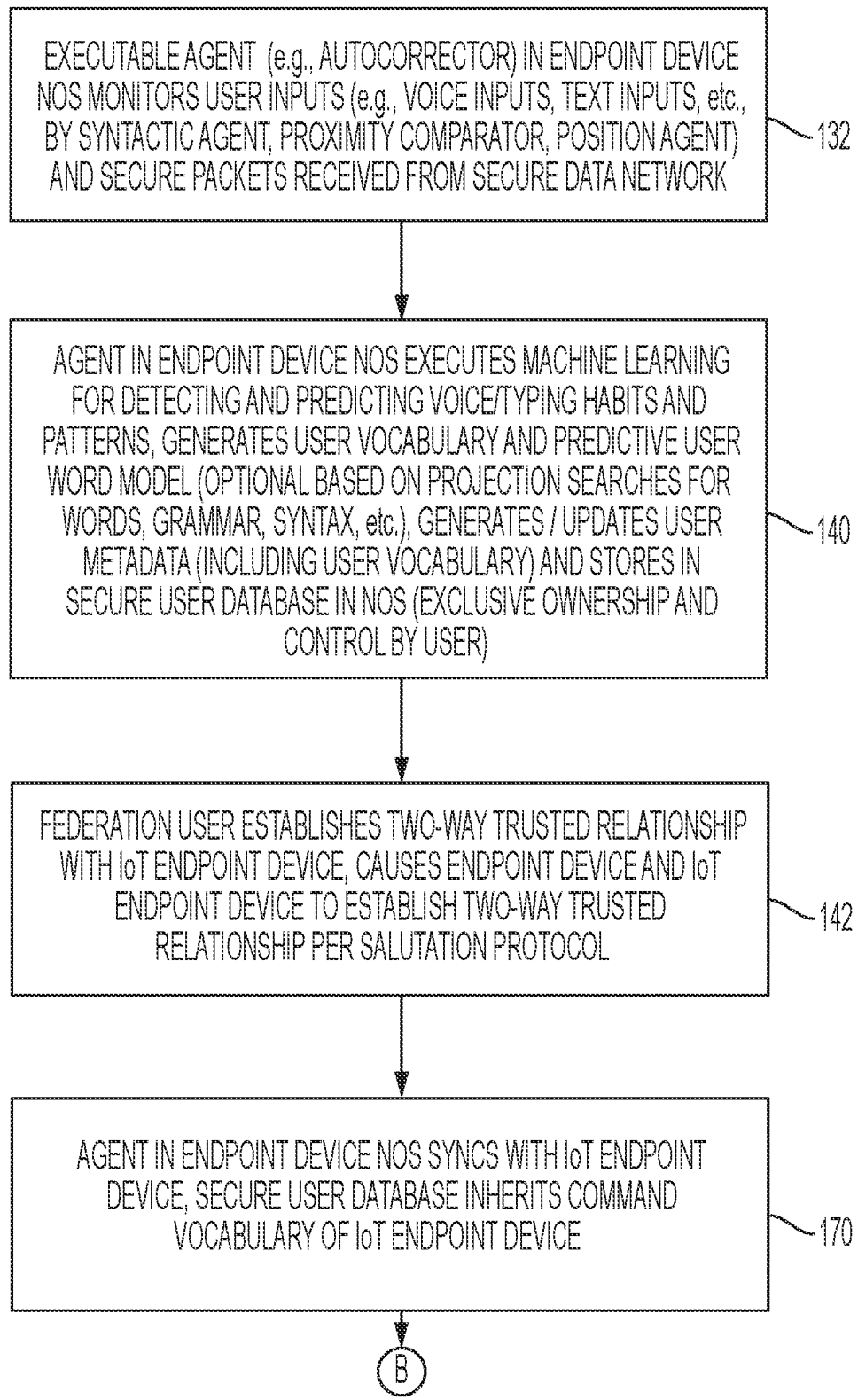

Referring to FIG. 8C, an executable autocorrector agent 104 of the endpoint device "A" 12 in operation 132 can execute secure machine learning operations, and autonomically execute improved operations based on the secure machine learning operation, while preserving the security and secrecy of the secure user database 168, without unauthorized distribution of the user metadata. Existing autocorrector keyboard systems on existing smart phones are configured to perform data mining on the user: existing smart phones can monitor and track a user's typing history and forward the results to a back-end database controlled by the manufacturer, for (often unauthorized) data mining about the user. Hence, a substantial problem of existing systems is that the data mining has been used to build a model of the user that can be used to influence user opinion and present addictive content to the user, without the knowledge or consent by the user.

The autocorrector 104 executed in the endpoint device "A" 12 in operation 140 can monitor the characters of words typed by the federation user "F1" while maintaining security and privacy of the user metadata, with no unauthorized distribution of the user metadata stored in the secure database 168. The autocorrector 104 in operation 140 monitors all typing behaviors by the user and all conversations by the user with other users, and generates and/or updates the secure user database 168 based on the typing behaviors by the user. The autocorrector 104 in operation 140 can generate and update the user vocabulary 134 with the words used by the user; the autocorrector 104 in operation 140 also can generate, based on the user vocabulary 104, a predictive model of words ("predictive user word model") 138 that the user "F1" is predicted to input on the user keyboard of the endpoint device "A" 12.

The autocorrector 104 can include executable agents (not shown) for execution of operation 140, for example: a syntactic agent that recognizes word syntax; a proximity comparator agent that recognizes the proximity of letters and characters to one another word combinations; and a position agent that recognizes how far apart keyboard keys are positioned on a user keyboard for recognition of typographical errors and intended keystrokes.

The autocorrector 104 also can utilize language-specific keyboard models, and heuristic models that are built from the user's vocabulary 134; the autocorrector 104 also can load dictionaries based on a user's geographic location, professional associations, etc. Hence, over time the autocorrector 104 in operation 140 can execute machine learning to learn the user's vocabulary, user input patterns such as typing patterns (including abbreviations, typing of adjacent keys as typographical errors instead of actual word letters, etc.), and user semantic patterns of various word styles and phrases. As described previously, however, the autocorrector 104 does not share any of the above-described learned user metadata outside the user's federation of endpoint devices without explicit user permission.

The autocorrector 104 also can enhance the user vocabulary 134 based on each endpoint device 12 that is added to the user's federation 34. For example, an IoT-enabled endpoint device can be implemented with a prescribed command vocabulary before secure registration within a user's federation.

In response to the federation user "F1" establishing a two-way trusted relationship in operation 142 with an IoT-enabled endpoint device as described previously with respect to the identity management system 86 of FIG. 5, the autocorrector 104 in any existing endpoint device (e.g., "A", "A1") 12 of the user's federation "F1" 32 in operation 170 can synchronize with the Iot-enabled endpoint device 12, and adopt and inherit the prescribed command vocabulary installed in the IoT-enabled endpoint device 12 into the existing vocabulary 134.

Figure 8D:
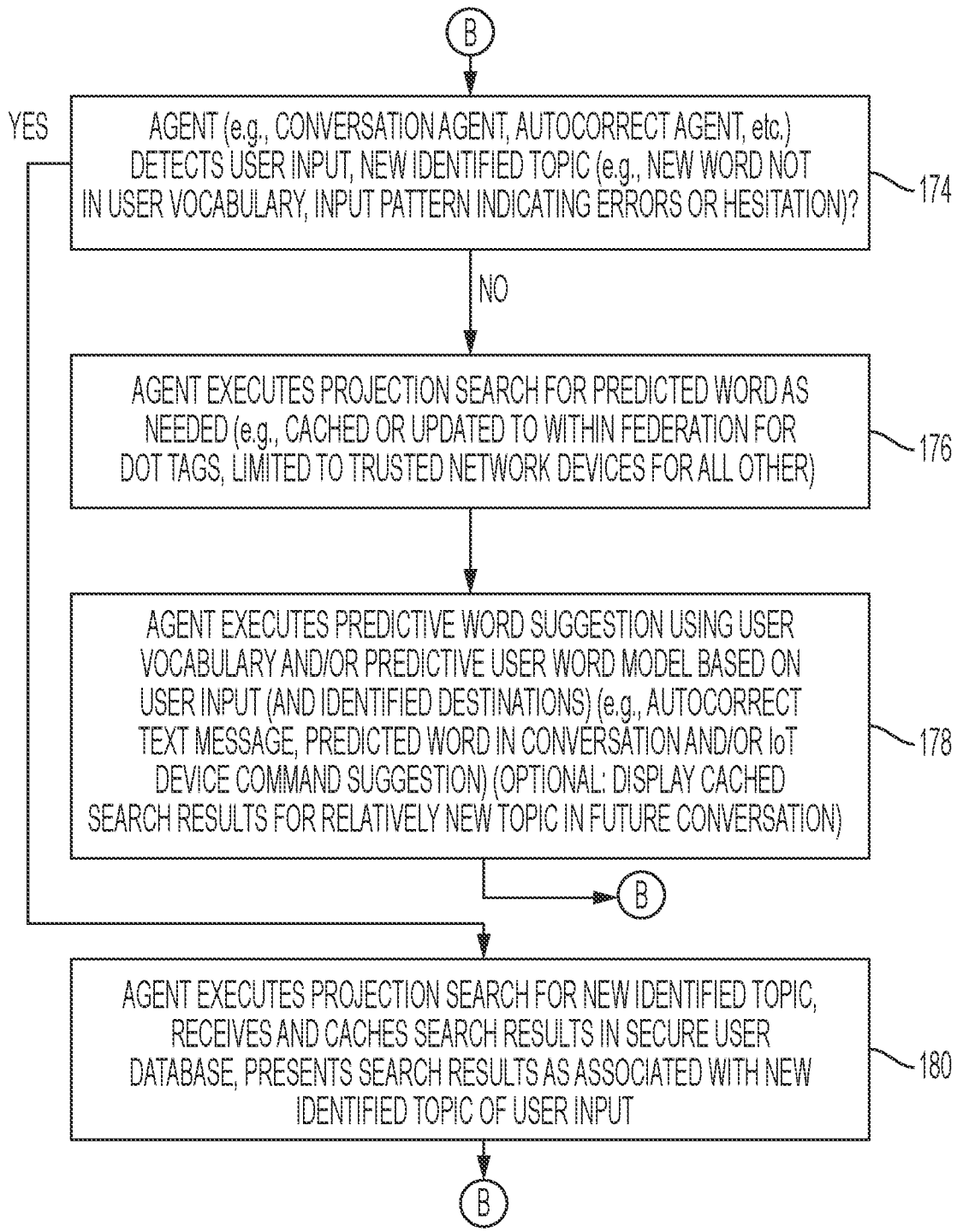

Referring to FIG. 8D, updating of the vocabulary 134 and/or the predictive user word model 138 (e.g., with the IoT command vocabulary) enables any one or more of the agents of the private user-assist suite 172 (e.g., the voice agent 102, the autocorrector 104, the conversation agent 166) in operation 174 to predict words input by the federation user "F1", including IoT commands and/or parameters that the user "F1" may input in a conversation with the IoT-enabled endpoint device.

For example, an IoT-enabled home automation system that is within the user's federation 34 can include an endpoint device 12 implemented as an IoT-enabled door lock: the federation user "F1", using another endpoint device "A" 12 can enter a command to unlock the IoT-enabled door lock based on adding, to a conversation with the IoT-enabled door lock, a beginning of a command (e.g, pressing the key "u" or adjacent keys "y", "h", "j", or "i", or speaking "un . . . ") that is detected by the autocorrector in operation 174: the autocorrector 104 in operation 178 can detect (based on the predictive user word model 138 and the user vocabulary 134) that the federation user "F1" is in a conversation with the IoT-enabled door lock and is attempting to enter the "unlock" command; hence, the autocorrector 104 (determining no projection search is needed in operation 176) in operation 178 can execute the predictive word suggestion to auto-complete the command as "unlock". Hence, the autocorrector 104 can execute words suggestions that are provided to the user interface device as the user is typing into the device keyboard.

Similarly, the voice agent 102 enables automated detection of a user input in operation 174, selective execution of a projection search in operation 176 as described above (if needed), and predictive word suggestion or predictive voice command implementation in operation 178.

The voice agent 102 can detect voice commands and in response execute thematic analysis, semantic analysis, and linguistic analysis on the voice commands for voice interactions. Thematics analysis enables the voice agent 102 (or any other executable agent in the private user-assist suite 172) in the network operating system 56 to determine the relationships of different commands and attributes over time (or how they relate temporally to one another), enabling the voice agent 102 (or any other executable agent in the private user-assist suite 172) to interpret the phrase "that thing we were talking about a few minutes ago" in an ongoing dialog as relating to an identifiable subject discussed in an identifiable context for an identifiable destination endpoint device.

The execution of the thematics analysis in the network operating system 56 enables the identification of a subject in context with an identifiable destination endpoint device 12 by an executable agent in the private user-assist suite 172, even if the ongoing dialog involves different applications at different times (e.g., email message, then chat message, then picture messaging application, then voice application; chat message followed by a conversation with a security system, etc.). Consequently, the voice agent 102 (or any other executable agent in the private user-assist suite 172) can maintain and apply the identified context forward across different executable agents because the thematics analysis is retained in the network operating system 56 underlying the application layer 14.

Hence, the voice agent 102 can interpret the voice commands, based on the thematic, semantic, and linguistic analysis, for implementation of natural language processing of machine-executable commands for conversational-style control, for example of machine-based endpoint devices such as IoT-based endpoint devices.

Hence, the agents in the private user-assist suite 172 (e.g., the voice agent 102, the autocorrector 104, etc.) can facilitate and enhance the ability of the user "F1" to converse with other network entities via keyboard input (or voice-activated audio input via a microphone of the user interface device), without any risk of any unauthorized distribution of any user metadata from the secure user database 168. If desired, any agent in operation 176 also can dynamically execute a projection search as desired, for example as part of a secure transclusion operation by the private user-assist suite 172 in the endpoint device "A" 12.

In particular, another example of improved operations in network based services includes dynamic execution of transclusion by an agent (e.g., the conversation agent 166 or distributed lazy loader 206) in response to detecting in operation 174 content entered by a federation user "P1". For example, an agent (e.g., the conversation agent 166 or distributed lazy loader 206) of the private user-assist suite 172 can monitor a federation user composing (via text or speech-to-text) a document: the agent of the private user-assist suite 172 can detect in operation 174 from the document an identifiable topic (e.g., "transclusion"), and in response the agent can execute in operation 176 a projection search for information related to the identifiable topic in response to detecting a search event that indicates a projection search should be executed in operation 176. For example, an executable agent in the private user-assist suite 172 of the network operating system 56 can detect a search event from thematic, semantic, and linguistic analysis of the document during composition by the user "F1" indicating that the user is encountering difficulty in describing the identifiable topic (e.g., based on slowed typing or speaking, numerous corrections within the identifiable topic, etc.), and further based determining from the secure user database 168 (e.g., the user vocabulary 134) that the federation user "F1" has never described the identifiable topic beforehand. Hence, the agent of the private user-assist suite 172 in operation 176 can execute a projection search for information related to the identifiable topic (e.g., "transclusion") as described previously with respect to FIGS. 8A and 8B, for assisting the federation user "F1" in composing the document.

As described previously, distributed search (DS) agent 82 in a replicator device (e.g., "R1") 16 in operations 112 to 128 of FIGS. 8A and 8B can execute a distributed search for the identifiable object in order to obtain the projection search results and return the projection search results to the endpoint device "A" 12.

The agent of the private user-assist suite 172 in the endpoint device "A" 12 in operation 180 can cache the search results in the secure user database 168 (e.g., in the user vocabulary 134), and execute the dynamic transclusion in response to receiving the projection search results. For example, the agent of the private user-assist suite 172 (e.g., the distributed lazy loader 206) in operation 180 can display in an endpoint device display (e.g., on a side panel of the document composed by the federation user) the projection search results as "summary references" (e.g., summary descriptions of the respective projection search results with respective embedded links) for use by the user.

Hence, the private user-assist suite 172 enables a federation user "F1" to learn more about the identified topic based on the dynamic transclusion that enables the federation user "F1" to select one of the summary references for any one or more of: viewing or consuming the corresponding projection search result; saving or "bookmarking" the projection search result; and/or inserting the projection search result into the document composed by the federation user.

As noted previously, a further example of improved operations in the network-based services includes the agent of the private user-assist suite 172 in the network operating system 56 caching or saving the projection search results within the secure user database 168 that tracks the user behaviors, enabling the building of the "vocabulary" and "knowledge base" of a federation user based on adding to the secure user database 168 the projection search results of the identifiable topic.

Hence, an agent (e.g., the conversation agent 166) in the network operating system 56 can detect in operation 174 during a subsequent conversation (e.g., voice communication, text-based communication, etc.) with a second federation user (e.g., "F2") that the federation user "F1" is attempting to describe the identifiable topic (e.g., the topic of "transclusion"), for example based on linguistic analysis of the subsequent conversation: the agent in response can retrieve from the secure user database 168 the cached/saved projection search results related to the identifiable topic (e.g., "transclusion"), and present to the federation user "F1" in real time the projection search results as metadata to the existing conversation object with the second federation user "F2" that is a participant in the conversation object 42. Hence, an agent in the private user-assist suite 172 can assist in real time the federation user "F1" in describing the identifiable topic (e.g., "transclusion") to the second federation user "F2" based on adding the metadata associated with the identifiable topic to the conversation.

As apparent from the foregoing, the agents of the private user-assist suite 172 can become more intelligent as the secure user database 168 is populated with the "vocabulary", "knowledge base", and personal interests of the federation user, enabling the agents to distinguish between information that is well known within the knowledge base of the federation user and information that is relatively new or unknown by the federation user. Moreover, all of the agent operations according to the example embodiments are executed in the network operating system 56 to maintain the security of all user metadata stored in the secure user database 168 on behalf of the federation user.

Another example improved operation for network-based services in the secure data network 5 includes assisting the federation user "F1" in autonomically joining a conversation, autonomically creating new two-way trusted relationships with other network entities in the secure data network, and autonomic synchronization of data structures in response to an endpoint device 12 reconnecting to the secure core network 10.

Figure 8E:
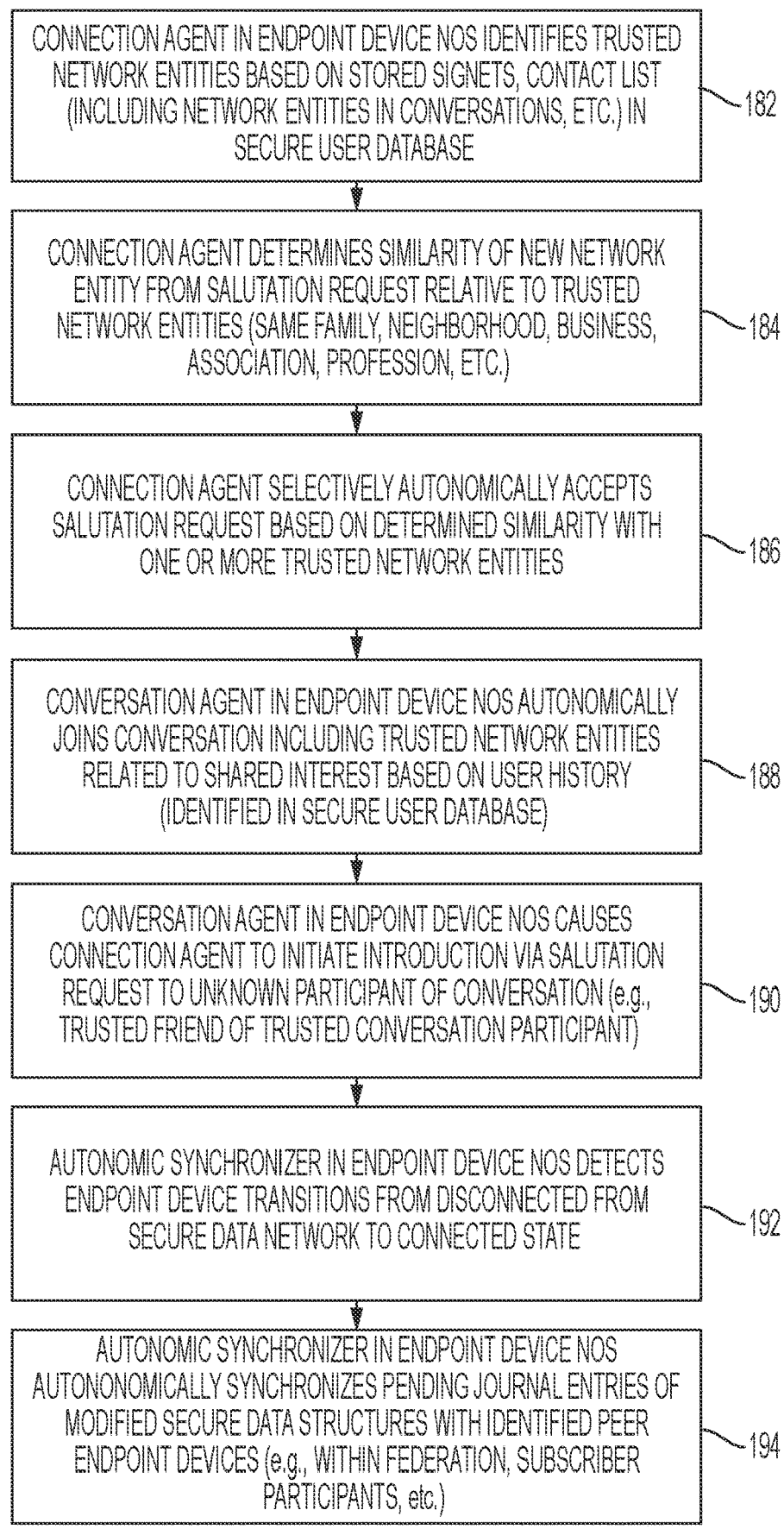

Referring to FIG. 8E, the social connection agent 252 of the private user-assist suite 172 in operation 182 can identify two-way trusted network entities based on the stored signets 146 in the secure database 168. The social connection agent 252 in operation 182 can generate a "social index" that maps the two-way trusted network entities to associated conversations, shared message objects 36, etc. Hence, the social connection agent 252 can track communications and identity attributes (e.g., email address to federation ID, family name to federation ID, rejected email addresses to federation IDs, rejected family names to federation IDs, revoked federation IDs) based on feedback provided by the user. Other attributes (e.g., professional identity, work address, home address, etc.) can be used by the connection agent to determine a "social closeness" with other network entities.

The social connection agent 252 in operation 184 can determine a relative similarity of a new network entity (identified by a received salutation request according to the prescribed secure salutation protocol) to existing two-way trusted network entities based on the identification of the two-way trusted network entities (e.g., based on the "social index"), including for example same family name, same neighborhood, same business or employer, same association, same profession (e.g., a professional colleague), etc.

Hence, the social connection agent 252 of the private user-assist suite 172 in operation 186 can selectively autonomically accept the salutation request based on the determined similarity with other two-way trusted network entities identified in the contact list 146 as having established a two-way trusted relationship with the federation user "F1".

The conversation agent 166 in operation 188 can assist in deciding whether the user "F1" or another federation entity (e.g., "F2" or "F3") should join a new or existing conversation, including whether to automatically accept an invitation to join a conversation. For example, the conversation agent 166 can identify from a conversation object 42 that another federation entity (e.g., "F2") would be interested in the subject of the conversation object 42, for example based on the conversation object 42 and the federation entity "F2" (identified in the contact list 146 containing the signets) both are tagged with the same dot tag (e.g., "•PIZZA_LOVERS"). Hence, the conversation agent 166 can "attract" another federation entity "F2" to a conversation based on sending an invitation to the federation entity "F2" to join the conversation.

The network operating system 56 can ensure that an endpoint device 12 can generate a dot tag, and that the scope of distribution (and corresponding scope of any projection search) is limited to strictly within the endpoint devices 12 belonging to the same federation 34. Hence, the network operating system 56 (and its executable components) can ensure that usage and projection search scope of a dot tag (as applied to any data object 22, 36, 42, or signet 146, etc.) is limited to a federation scope comprising one or more endpoint devices (e.g., "A", "A1") within the same federation "F1" 18, based on having the same federation ID 18. Consequently, each federation 34 can execute its own private information management using its own set of dot tags. Additional details regarding use of dot tags and attracting a federation entity to join a conversation are described in commonly-assigned, copending application Ser. No. 17/372,607, filed Jul. 12, 2021, entitled "DIRECTORY SERVER PROVIDING TAG ENFORCEMENT AND NETWORK ENTITY ATTRACTION IN A SECURE PEER-TO-PEER DATA NETWORK", the disclosure of which is incorporated in its entirety herein by reference.

The conversation agent 166 also in operation 188 also can autonomically join a conversation in response to a received invitation, for example based on detecting from a corresponding subscriber list 50 of the conversation object 42 that the conversation includes two-way trusted network entities (identified in the contact list 146), and that the user "F1" has a shared interest in the subject of the conversation object 42. The shared interest can be determined by the conversation agent 166 identifying the interests of the federation user "F1" as identified in the secure user database 168 from prior messages, conversations, etc.

In response to the user "F1" (or the conversation agent 166 on the user's behalf) joining a conversation, the conversation agent 166 in operation 190 also can assist the user "F1" by executing a policy for selectively introducing the user to other unknown participants of the conversation via the social connection agent 252. In particular, the conversation agent 166 can cause the social connection agent 252 to interact with peer connection agents of the other unknown participants in the conversation to initiate and coordinate open introductions between the user and the unknown participants, for example based on sending a salutation request to the unknown participants of the conversation: the salutation request generated and sent by the social connection agent 252 also can identify other trusted conversation participants in which the user "F1" has a two-way trusted relationship, enabling the unknown participant (e.g., "F215") receiving the salutation request to recognize that the user "F1" has two-way trusted relationships with other trusted conversation participants.

The corresponding social connection agent 252 executed in the network operation system 56 of the endpoint device 12 owned by the unknown participant "F215" can identify to the user "F215" common two-way trusted relationships between the user "F1" having sent the salutation request and the user "F215" (e.g., conversation participants "F121" and "F135" have two-way trusted relationships with the salutation requestor "F1" and the salutation receiver "F215"). As described previously, the social connection agent 252 of the user "F215" can be configured to autonomically accept in operations 182, 184, and 186 the salutation request from the user "F1" based on the common two-way trusted relationships with the federation users "F121" and "F135".

If in any of the above cases an agent of the private user-assist suite 172 has insufficient information to reach its own decision, the agent can present the options to the user with an optional recommendation and reasons why the recommendation was made by the agent; the agent also can track the decision executed by the user, and execute machine-based differential analysis to learn from the user decision by adjusting its feature heuristics to converge on a better decision for future decisions (e.g., learn why the user rejected an agent recommendation).

Another example improved operation for network-based services in the secure data network 5 includes the autonomic synchronizer 52 in operation 192 detecting that the endpoint device "A" 12 has transitioned from a disconnected state (e.g., "offline" where the secure data network 5 and/or the secure core network 10 was not available (e.g., during travel, etc.)) to a connected "online" state where another network device (e.g., a peer endpoint device "A1" 12 or a replicator device 16) is reachable.

The autonomic synchronizer 52 can respond to the transition to the online state of the endpoint device "A" 12 by autonomically synchronizing in operation 194 all secure data structures that have been modified while "offline", based on synchronizing journal entries 184 that identify hypercontent changes in each modified data object in the network operating system 56. The autonomic synchronizer 52 in operation 194 can execute the autonomic synchronization with the appropriate peer endpoint devices, depending on the data structure being modified (e.g., update conversation participants of changes to a conversation object 42 or message object 36, update federation devices), etc., including synchronizing the secure user database 168 between endpoint devices (e.g., "A" and "A1") 12 belonging to the same federation (e.g., "F1") 34. The autonomic synchronizer 152 can execute gossip protocols to reach the closest network device having the most recent version of a secure data object, enabling the autonomic synchronizer 152 in the endpoint device "A" to move toward "truth" (i.e., the most recent version available) based on the relative connection availability of all the endpoint devices storing the associated secure data object.

According to example embodiments, a network operating system provides exclusive and authoritative control for accessing the secure data network and any at-rest or in-flight secure data structure. The network operating system includes an AI-based private user-assist suite that executes machine learning on user behaviors, and providing enhanced user-assistance services for enhanced user services via the secure data network, without disclosure of any user behavior or machine learning results outside of a federation owned by the user. Search results are further anonymized by a replicator device that executes the corresponding network operating system and anonymizes any user-identifiable information from any search request, enabling execution of projection searches in a manner that provides complete anonymity of all network users in the secure data network.

Although the example embodiments illustrate the pairwise topology of two-way trusted replicator devices as a mesh of trusted replicator devices, other topologies (e.g., star, tree, hybrid, etc.) can be used to deploy the pairwise topology of two-way trusted replicator devices.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:
1. A method comprising:
   initiating, by a secure executable container executed by a network device, a two-way trusted relationship with a second network device in a secure peer-to-peer data network, wherein:
      each physical network device in the secure peer-to-peer data network executes the secure executable container,
      the secure executable container maintains exclusive control to any access of the secure peer-to-peer data network,
      the secure peer-to-peer data network is established based on an aggregation of a plurality of the two-way trusted relationships,
      the secure peer-to-peer data network is cloudless, and
      no network device in the secure peer-to-peer data network uses a certificate issued by a third party certifying authority;
   initiating, by an executable agent within the secure executable container, a monitoring of a network-based service between the network device and the second network device having the corresponding two-way trusted relationship with the network device within the secure peer-to-peer data network, the network-based service based on one or more of a first secure data structure having a secure storage in the network device or a second secure data structure for secure communications in the secure peer-to-peer data network;
   executing, by the executable agent, a secure machine learning operation based on one or more user actions associated with the network-based service, wherein the secure executable container prevents any executable resource in the network device from:
      accessing any unencrypted form of the first or second secure data structures without authorized access via a prescribed Application Programming Interface (API) required by and executed within the secure executable container, and accessing the secure peer-to-peer data network without authorized access via a prescribed Application Programming Interface (API) required by and executed within the secure executable container; and autonomically executing, by the executable agent, an improved operation for the network-based service based on the secure machine learning operation; wherein each and every data packet that is to traverse the secure peer-to-peer data network is always encrypted by the secure executable container into a corresponding secure data packet, and the secure executable container is different than an operating system executed by the network device, and the secure executable container is different from the operating system providing the network device with access to a second data network that is distinct from the secure peer-to-peer data network.

2. The method of claim 1, wherein:

the secure machine learning operation is based on the secure executable container executed in the network device having established a two-way trusted relationship with a user that supplies the one or more user actions following establishment of the two-way trusted relationship;

the executing of the secure machine learning operation including generating user metadata based on the one or more user actions, and storing the user metadata in a secure user database that is exclusively owned and controlled by the user.

3. The method of claim 2, wherein the executing of the secure machine learning operation further includes:

generating, as part of the user metadata, a user vocabulary based on detecting vocabulary words from the one or more user actions, the detecting vocabulary words including detecting a user input pattern for the vocabulary words; and updating the user metadata with the user vocabulary.

4. The method of claim 3, wherein the executing of the secure machine learning operation further includes:

establishing a corresponding two-way trusted relationship with an endpoint device in response to the user having established a corresponding two-way trusted relationship with the endpoint device, the network device and the endpoint device belonging to a same federation of devices owned by the user; and inheriting, from the endpoint device, a prescribed command vocabulary of device commands to the endpoint device;

the autonomically executing including selectively supplying an identified one of the device commands as a command suggestion in response to detecting a user attempt to send an instruction to the endpoint device.

5. The method of claim 3, wherein the autonomically executing includes:

generate and adding to the secure user database a predictive user word model based on the one or more user actions; and selectively supplying a word suggestion in response to detecting an input by the user, based on at least one of the user vocabulary or the predictive user word model.

6. The method of claim 3, wherein:

the executing of the secure machine learning operation comprises detecting a new identified topic that is input by the user based on at least one of real-time analysis of a user input by the user, or a determined absence of the new identified topic in the user vocabulary;

the autonomically executing includes executing a projection search for the new identified topic in the secure peer-to-peer data network, and presenting search results describing the new identified topic to the user as associated with the user input.

7. The method of claim 6, wherein:

the executing of the secure machine learning operation comprises storing the search results describing the new identified topic in the secure user database;

the autonomically executing including detecting the new identified topic in a conversation object exchanged between the user and a conversation subscriber, and autonomically adding to the conversation object the network identified topic stored in the secure database.

8. The method of claim 2, wherein:

the secure machine learning operation includes identifying trusted network entities in which respective two-way trusted relationships have been established;

the autonomically executing improved operation includes at least one of:

autonomically creating a corresponding two-way trusted relationship with a new network entity providing a corresponding salutation request according to a prescribed secure salutation protocol, based on the trusted network entities, or autonomically joining a conversation including one or more of the trusted network entities.

9. The method of claim 8, wherein the autonomically executing includes selectively initiating an introduction to an unknown participant of the conversation based on sending to the unknown participant a corresponding salutation request according to the prescribed secure salutation protocol.

10. The method of claim 1, wherein the secure machine learning operation is based on:

execution of the secure machine learning operation within the secure executable container;

anonymizing a request, sent from the second network device based on the one or more user actions, into an anonymous request; and forwarding at least a portion of the anonymous request in a projection search request to a third network device within the secure peer-to-peer data network for execution of a projection search operation.

11. The method of claim 10, wherein the secure machine learning operation further includes:

anonymizing a plurality of the requests into respective anonymous requests;

aggregating the anonymous requests into an aggregated search request; and selectively splitting the aggregated search request into anonymous projection searches;

the forwarding including forwarding the anonymous projection searches to respective network devices, including the third network device, for distributed execution of the anonymous projection searches.

12. The method of claim 10, wherein the autonomically executing includes receiving a search result responsive to the projection search request;

caching the search result in a local memory circuit; and sending at least a portion of the search result to the second network device.

13. The method of claim 12, wherein the autonomically executing further includes:
selectively extracting, from the search result, a data object comprising an executable identifier configured for identifying a user device that renders the data object;
generating a safe data object that substitutes for the data object and that does not include the executable identifier, enabling rendering of the safe data object that is unable to identify any user information of any user device that renders the safe data object; and
caching the safe data object, wherein the safe data object is supplied as said at least a portion of the search result.

14. The method of claim 13, wherein the data object is originated from an external data network outside the secure peer-to-peer data network.

15. The method of claim 1, wherein the autonomically executing includes:
detecting a transition from a disconnected state where the secure peer-to-peer data network was not available to the network device to a connected state where the second network device is reachable; and
autonomically synchronizing, with the second network device, with one or more secure data structures having been modified during a disconnected state, for updating the one or more secure data structures toward a most-recently updated version of the one or more secure data structures in the secure peer-to-peer data network.

16. The method of claim 1, further comprising cryptographically generating, by the secure executable container, a private key and corresponding public key for encryption operations associated with the first secure data structure and the second secure data structure.

17. The method of claim 1, wherein the secure machine learning operation prevents any user identifier or any associated user metadata from being distributed beyond a trusted replicator device that is one hop away from a user device having detected the one or more user actions input into the user device by a user.

18. One or more non-transitory tangible media encoded with logic for execution by a machine and when executed by the machine operable for:
initiating, by the machine implemented as a network device and executing the logic as a secure executable container, a two-way trusted relationship with a second network device in a secure peer-to-peer data network, wherein:
each physical network device in the secure peer-to-peer data network executes the secure executable container,
the secure executable container maintains exclusive control to any access of the secure peer-to-peer data network,
the secure peer-to-peer data network is established based on an aggregation of a plurality of the two-way trusted relationships,
the secure peer-to-peer data network is cloudless, and no network device in the secure peer-to-peer data network uses a certificate issued by a third party certifying authority;
initiating, by an executable agent within the secure executable container, a monitoring of a network-based service between the network device and the second network device having the corresponding two-way trusted relationship with the network device within the secure peer-to-peer data network, the network-based service based on one or more of a first secure data structure having a secure storage in the network device or a second secure data structure for secure communications in the secure peer-to-peer data network;
executing, by the executable agent, a secure machine learning operation based on one or more user actions associated with the network-based service, wherein the secure executable container prevents any executable resource in the network device from:
accessing any unencrypted form of the first or second secure data structures without authorized access via a prescribed Application Programming Interface (API) required by and executed within the secure executable container, and
accessing the secure peer-to-peer data network, without authorized access via a prescribed Application Programming Interface (API) required by and executed within the secure executable container; and
autonomically executing, by the executable agent, an improved operation for the network-based service based on the secure machine learning operation; wherein
each and every data packet that is to traverse the secure peer-to-peer data network is always encrypted by the secure executable container into a corresponding secure data packet, and
the secure executable container is different than an operating system executed by the network device, and the secure executable container is different from the operating system providing the network device with access to a second data network that is distinct from the secure peer-to-peer data network.

19. The one or more non-transitory tangible media of claim 18, wherein:
the secure machine learning operation is based on the secure executable container executed in the network device having established a two-way trusted relationship with a user that supplies the one or more user actions following establishment of the two-way trusted relationship;
the executing of the secure machine learning operation including generating user metadata based on the one or more user actions, and storing the user metadata in a secure user database that is exclusively owned and controlled by the user.

20. The one or more non-transitory tangible media of claim 19, wherein the executing of the secure machine learning operation further includes:
generating, as part of the user metadata, a user vocabulary based on detecting vocabulary words from the one or more user actions, the detecting vocabulary words including detecting a user input pattern for the vocabulary words; and
updating the user metadata with the user vocabulary.

21. The one or more non-transitory tangible media of claim 18, wherein the secure machine learning operation is based on:
execution of the secure machine learning operation within the secure executable container;
anonymizing a request, sent from the second network device based on the one or more user actions, into an anonymous request; and
forwarding at least a portion of the anonymous request in a projection search request to a third network device within the secure peer-to-peer data network for execution of a projection search operation.

22. An apparatus implemented as a physical machine, the apparatus comprising:
- non-transitory machine readable media configured for storing executable machine readable code;
- a device interface circuit; and
- a processor circuit configured for executing the machine readable code, and when executing the machine readable code operable for:
  - initiating, by a secure executable container executed by the apparatus implemented as a network device, a two-way trusted relationship with a second network device in a secure peer-to-peer data network, wherein:
    - each physical network device in the secure peer-to-peer data network executes the secure executable container,
    - the secure executable container maintains exclusive control to any access of the secure peer-to-peer data network,
    - the secure peer-to-peer data network is established based on an aggregation of a plurality of the two-way trusted relationships,
    - the secure peer-to-peer data network is cloudless, and
    - no network device in the secure peer-to-peer data network uses a certificate issued by a third party certifying authority;
  - initiating, by an executable agent within the secure executable container, a monitoring of a network-based service between the network device and the second network device having the corresponding two-way trusted relationship with the network device within the secure peer-to-peer data network, the network-based service based on one or more of a first secure data structure having a secure storage in the network device or a second secure data structure for secure communications in the secure peer-to-peer data network,
  - executing, by the executable agent, a secure machine learning operation based on one or more user actions associated with the network-based service, wherein the secure executable container prevents any executable resource in the network device from:
    - accessing any unencrypted form of the first or second secure data structures without authorized access via a prescribed Application Programming Interface (API) required by and executed within the secure executable container, and
    - accessing the secure peer-to-peer data network, without authorized access via a prescribed Application Programming Interface (API) required by and executed within the secure executable container, and
  - autonomically executing, by the executable agent, an improved operation for the network-based service based on the secure machine learning operation; wherein
  - each and every data packet that is to traverse the secure peer-to-peer data network is always encrypted by the secure executable container into a corresponding secure data packet, and
  - the secure executable container is different than an operating system executed by the network device, and the secure executable container is different from the operating system providing the network device with access to a second data network that is distinct from the secure peer-to-peer data network.

* * * * *